United States Patent [19]
Kuslak et al.

[11] Patent Number: 5,724,533
[45] Date of Patent: Mar. 3, 1998

[54] HIGH PERFORMANCE INSTRUCTION DATA PATH

[75] Inventors: John S. Kuslak, Blaine; Gary J. Lucas, Pine Springs, both of Minn.

[73] Assignee: Unisys Corporation, Blue Bell, Pa.

[21] Appl. No.: 558,246

[22] Filed: Nov. 17, 1995

[51] Int. Cl.[6] .................................................. G06F 9/312
[52] U.S. Cl. ............................................ 395/381; 395/591
[58] Field of Search ................................. 395/591, 381, 395/444–496; 711/118–146

[56] References Cited

U.S. PATENT DOCUMENTS

| | | |
|---|---|---|
| 3,806,888 | 4/1974 | Brickman et al. . |
| 4,189,770 | 2/1980 | Gannon et al. . |
| 4,189,772 | 2/1980 | Liptay . |
| 4,225,922 | 9/1980 | Porter . |
| 4,354,232 | 10/1982 | Ryan . |
| 4,426,681 | 1/1984 | Bacot et al. . |
| 4,433,374 | 2/1984 | Hanson et al. . |
| 4,437,149 | 3/1984 | Pomerene et al. . |
| 4,646,233 | 2/1987 | Weatherford et al. . |
| 4,843,542 | 6/1989 | Dashiell et al. . |
| 4,847,753 | 7/1989 | Matsuo et al. . |
| 4,851,993 | 7/1989 | Chen et al. . |
| 4,855,904 | 8/1989 | Daberkow et al. . |
| 4,888,679 | 12/1989 | Fossum et al. . |
| 4,905,188 | 2/1990 | Chuang et al. . |
| 4,924,376 | 5/1990 | Ooi . |
| 4,926,323 | 5/1990 | Baror et al. . |
| 4,953,121 | 8/1990 | Muller . |
| 4,964,046 | 10/1990 | Mehrgardt et al. . |
| 4,992,930 | 2/1991 | Gilfeather et al. . |
| 5,023,776 | 6/1991 | Gregor . |
| 5,025,365 | 6/1991 | Mathur et al. . |
| 5,025,366 | 6/1991 | Baror . |
| 5,027,270 | 6/1991 | Riordan et al. . |
| 5,150,469 | 9/1992 | Jouppi ................................. 395/591 |
| 5,193,163 | 3/1993 | Sanders et al. . |
| 5,201,041 | 4/1993 | Bohner et al. . |
| 5,202,972 | 4/1993 | Gusefski et al. . |
| 5,247,639 | 9/1993 | Yamahata . |
| 5,261,066 | 11/1993 | Jouppi et al. . |
| 5,313,602 | 5/1994 | Nakamura . |
| 5,423,016 | 6/1995 | Tsuchiya et al. . |

OTHER PUBLICATIONS

"Data Processing System with Second Level Cache", IBM Technical Disclosure Bulletin, v. 21, No. 6, pp. 2468–2469, Nov. 1978.

*Primary Examiner*—William M. Treat
*Attorney, Agent, or Firm*—Nawrocki, Rooney & Sivertson, P.A.

[57] ABSTRACT

A method of and apparatus for efficiently halting the operation of the instruction processor when a cache miss is detected. Generally, this is accomplished by preventing unwanted address incrementation of an instruction address pipeline and by providing a null instruction to an instruction pipeline when a cache miss is detected. Accordingly, the present invention may eliminate a recovery period after a cache miss, thereby enhance the performance of the data processing system. Further, the present invention may eliminate recovery hardware required to support the recovery process.

39 Claims, 13 Drawing Sheets

HIGH PERFORMANCE INSTRUCTION DATA PATH

CROSS REFERENCE TO CO-PENDING APPLICATIONS

The present application is related to U.S. patent application Ser. No. 08/288,651, entitled "Cooperative Hardware and Microcode Control System for Pipelined Instruction Execution", which is a continuation of U.S. patent application Ser. No. 07/762,282, and U.S. patent application Ser. No. 07/762,276, entitled "Data Coherency Protocol for Multi-Level Cached High Performance Multiprocessor System", both assigned to the assignee of the present invention and both incorporated herein by reference.

BACKGROUND OF THE INVENTION

1. Field of the Invention

The present invention relates generally to data processing systems and more particularly relates to data processing systems employing cache memory.

2. Description of the Prior Art

It has been shown that the use of a small high speed memory, often called a cache memory, between an instruction processor and a much slower main memory tends to enhance performance. Instructions and data present within the cache memory at the time of requested access by the instruction processor are furnished much more quickly than those instructions and data which must be obtained from main memory.

To obtain maximum benefit from the use of a cache memory, it is desirable to anticipate which memory locations will be accessed by the instruction processor so that they may be preloaded into the cache memory. U.S. Pat. No. 3,806,888 issued to Brickman et al, shows an early data processing system employing a cache memory between the main memory (i.e. backing store) and the instruction processor (i.e. central processing unit). In this system, real memory is segmented into blocks or pages. If the instruction processor requests access to one data element of a block, the entire block is automatically transferred to the cache memory for subsequent use by the instruction processor. U.S. Pat. No. 4,225,922 issued to Porter attempts to improve upon the basic cache approach by segmenting the cache memory and by buffering cache commands. U.S. Pat. No. 4,354,232 issued to Ryan also buffers cache control commands.

The prefetching of data may be further complicated by variable length elements. U.S. Pat. No. 4,189,772 issued to Liptay attempts to address this problem by buffering the input to the cache memory. A decoder element is added by U.S. Pat. No. 4,437,149 issued to Pomerene et al, between the main memory and the cache memory to partially decode instructions before complete loading of the cache memory.

The cache memory and cache controller are placed on the same substrate in U.S. Pat. No. 5,025,366 issued to Baror. U.S. Pat. No. 4,905,188 issued to Chuang et al, describes a chip design for optimization of the hardware construction.

A multiprocessor system is shown in U.S. Pat. No. 5,023,776 issued to Gregor. The individual instruction processors have dedicated (i.e. L1) cache memories. Shared (i.e. L2) cache memories are interposed between the dedicated cache memories and the main (i.e. L3) memory. Write buffers are employed in parallel with the L2 caches. Multiple sequential writes bypass the L2 cache and proceed directly to the L3 memory through the write buffers.

U.S. Pat. No. 5,423,016, issued to Tsuchiya et al., discloses a system that stores prefetched data elements in a block buffer before loading them into a cache memory. This load is accomplished beginning from the requested data element first such that as soon as the requested data element has been loaded into the block buffer, it is made available to the instruction processor. In this way, the instruction processor is permitted to proceed executing subsequent instructions from cache memory, in parallel with loading of the remainder of the requested block of data into the block buffer. The instruction processor is able to obtain data from the cache memory because the cache memory is not busy storing the requested block.

In each of the prior art approaches, halting the instruction processor in an efficient manner continues to be a problem, particularly in pipelined architectures. For example, in a typical system, an instruction processor may include an instruction address pipeline and an instruction pipeline. The instruction address pipeline may be used to generate instruction addresses that are provided to the cache memory for prefetching instructions. The instruction pipeline may be used to stage or pre-process the pre-fetched instructions, including performing operand address generation, operand fetch, etc.

If a cache miss is detected in such a system, it is often difficult to prevent a garbage instruction from being provided to the instruction pipeline. That is, typically a cache miss signal may be provided near the end of the clock cycle that is used to pre-fetch the instruction from the cache memory, thereby limiting the amount of time remaining in the clock cycle to prevent the garbage instruction from being clocked into the instruction pipeline. Similarly, there may not be sufficient time to halt address incrementation in the instruction address pipeline. One solution has been to allow the garbage instruction to enter the instruction pipeline and allow the instruction address pipeline to increment until the cache miss signal is detected thereby. However, this solution may impose a significant recovery cost. That is, once the garbage instruction is clocked into the instruction pipeline and the instruction address pipeline is allowed to increment, it can take several clock cycles to recover therefrom. The instruction address pipeline may have to be resynchronized with the rest of the system, and many logic sequences may have to be halted to abort the execution of the garbage instruction. This may require a significant recovery period, while the system is in an essentially inactive state. Further, a significant amount of recovery hardware may be required, including logic and board route channels, to support the recovery process.

SUMMARY OF THE INVENTION

The present invention overcomes the disadvantages found in the prior art by providing a method of and apparatus for efficiently halting the operation of the instruction processor when a cache miss is detected. Generally, this is accomplished by preventing unwanted address incrementation of an instruction address pipeline and by providing a null instruction to an instruction pipeline when a cache miss is detected. Accordingly, the present invention may eliminate a recovery period after a cache miss, thereby enhancing the performance of the data processing system. Further, the present invention may eliminate the recovery hardware required to support the recovery process.

In an exemplary embodiment, the cache memory may be located near the instruction address pipeline, and a corresponding cache miss signal may be routed directly to the instruction address pipeline. In this configuration, the cache miss signal may arrive at the instruction address pipeline in sufficient time for the instruction address pipeline to halt unwanted address incrementation. It is contemplated that the instruction address pipeline and the cache memory may be located on the same physical substrate.

Further, a selector means may be provided between the cache memory and the instruction pipeline. The selector means may be controlled by a number of signals, including the cache miss signal. In the absence of a cache miss signal, the selector means may select the output of the cache memory such that instructions may be read directly from the cache memory to the instruction pipeline. However, when a cache miss is detected, the selector means may select a null instruction and provided the null instruction to the instruction pipeline. In contrast to a garbage instruction, the null instruction may not start any hardware sequences within the system, and therefore may not require a recovery sequence, and thus no extra logic to abort the recovery sequences. After the requested instruction is available from the cache memory, the selector means may select the output of the cache memory, wherein the desired instruction may be provided to the instruction pipeline.

In another exemplary embodiment, both a cache memory and a read buffer may be provided. The system may search both the cache memory and the read buffer before a cache miss is detected. When a cache miss is detected, a block of instructions containing the requested instruction may be read from a memory to the read buffer, beginning with the requested instruction first. As soon as the requested instruction has been loaded into the block buffer, it may be made available to the instruction pipeline. In this way, the instruction processor is permitted to proceed executing subsequent instructions from cache memory, in parallel with loading of the remainder of the requested block of data into the block buffer. The instruction processor is able to obtain data from the cache memory because the cache memory is not busy storing the requested block. The contents of the read buffer may be provided to the cache memory at the next read cache miss.

In this configuration, the selector means may select between the output of the cache memory, a null instruction and the output of the read buffer. Thus, the selector means may select the output of the cache memory during normal operation. However, when a cache miss is detected in the cache memory but a cache hit is detected in the read buffer, the selector means may select the output of the read buffer wherein the requested instruction may be provided to the instruction pipeline.

When a cache miss is detected in both the cache memory and the read buffer, the selector means may select the null instruction. Meanwhile, a block of instructions containing the requested instruction may be read from a memory and provided to the read buffer, beginning with the requested instruction first. Once the requested instruction is available in the read buffer, the selector means may select the output of the read buffer wherein the requested instruction may be provided to the instruction pipeline. This may occur in parallel with the transfer of the remaining instructions in the requested block of instructions to the read buffer.

If a subsequent instruction is also within the requested block of instructions, the selector means may select the null instruction input until the subsequent instruction becomes available in the read buffer. If a subsequent instruction is in cache memory, the selector means may select the output of the cache memory to provide the desired instruction to the instruction pipeline. Thus, the selector means may select the appropriate instruction source to receive a requested instruction, and may select a null instruction when the requested instruction is not available from any of the instruction sources.

It is contemplated that the present contents of the read buffer may be loaded into the cache memory, particularly when a subsequent cache miss is detected. That is, when a subsequent cache miss is detected, rather than discarding the contents of the read buffer, the contents may be loaded into the cache memory. It is further contemplated that a no save designator may be provided for preventing predetermined blocks of data within the read buffer from being loaded into cache memory. This may prevent data that is unlikely to be accessed soon, from displacing any data currently present in the cache memory.

By providing the above referenced selector means, and by locating the cache memory near the instruction address pipeline and providing a direct cache miss signal thereto, the requested instructions are provided to the instruction pipeline as soon as they become available. This may be accomplished because clock cycles are not wasted due to recovery or resynchronization of the system. Accordingly, a significant performance enhancement may be achieved over prior art systems.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
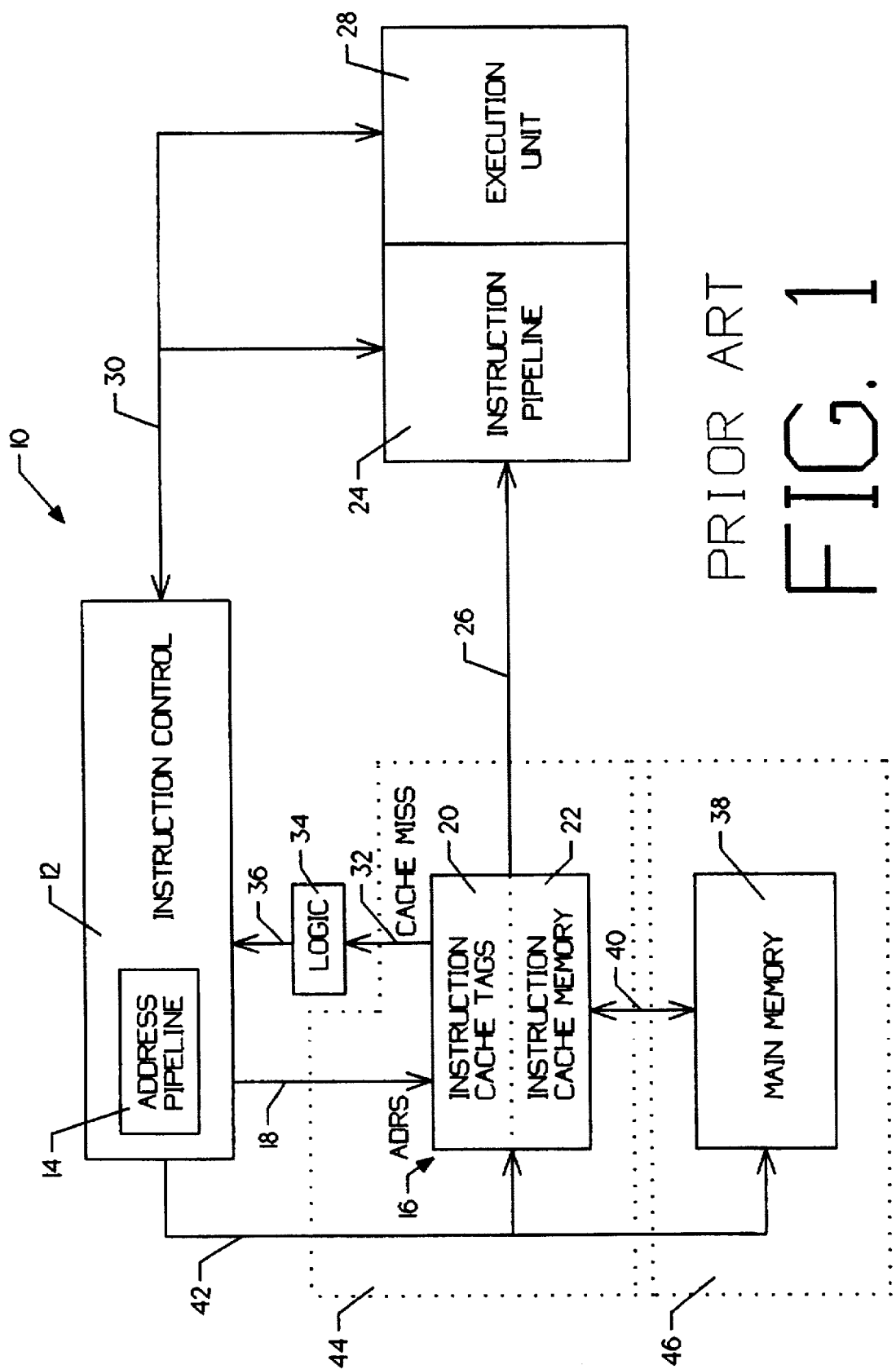
FIG. 1 is a block diagram showing the general operation of a prior art instruction data path.

FIG. 1 is a block diagram showing the general operation of a prior art instruction data path. The diagram is generally shown at 10. An instruction control unit 12 may be provided to control the sequence of instructions provided to instruction pipeline 24 and execution unit 28. Instruction control unit 12 typically includes an instruction address pipeline 14.

Instruction address pipeline 14 may prefetch instruction addresses and stage the instruction addresses for execution. In a typical prior art system, instruction address pipeline 14 may stage a current instruction address (N), and an address incrementation function may generate two subsequent instruction addresses (N+1 and N+2). Instruction address pipeline 14 may further calculate the proper instruction addresses subsequent to a jump instruction or other non-sequential instruction. A further discussion of instruction address pipeline 14 is provided with reference to FIG. 2 below.

Because main memory 38 may be relatively slow, particularly in system using a hierarchical memory architecture where a number of users may request access to main memory 38, an instruction cache 16 is provided. Instruction cache 16 typically includes an instruction cache tags portion 20 and an instruction cache memory portion 22. Instruction cache tags portion 20 is a memory containing the valid addresses within instruction cache memory portion 22, thereby indicating which instructions reside in instruction cache memory portion 22. Thus, by searching the instruction cache tags portion 20, instruction control 12 may determine if a requested instruction is present in the instruction cache memory portion 22.

Address pipeline 14 provides the address of the next sequential instruction to instruction cache tags portion 20 via interface 18. Instruction cache tags portion 20 is searched to determine if the requested instruction resides in the instruction cache memory portion 22. If the requested instruction resides in instruction cache memory portion 22, the requested instruction is provided to instruction pipeline 24 via interface 26.

If, however, the requested instruction is not resident in instruction cache memory portion 22, instruction cache tags portion 20 provides a cache miss signal 32. In a typical system, the cache miss signal 32 is provided back to instruction control 12, either through logic block 34 and/or via a relatively long path which may traverse a number of circuit boards and/or integrated circuits. For example, instruction cache 16 may be on a first circuit board 44, main memory 38 may be on a second circuit board 46, and instruction control 12 may be on yet another circuit board. Further, a cache miss signal may be provided near the end of the clock cycle that is used to pre-fetch the instruction from the instruction cache memory portion 22, thereby limiting the amount of time remaining in the clock cycle to halt address incrementation in instruction address pipeline 14. Thus, instruction address pipeline 14 may have to be resychronized with the rest of the system after a cache miss occurs. The resychnonization of instruction address pipeline 14 may require a number of clock cycles to de-pipe instruction address pipeline 14 and reload the proper addresses therein. Further, a substantial amount of support hardware may be required to support the resycnronization of address pipeline 14.

In addition to the above, if a cache miss occurs, a "garbage" instruction may be passed from instruction cache memory portion 22 to instruction pipeline 24 via interface 26. Once the garbage instruction is clocked into the instruction pipeline 24, a number of hardware logic sequences may be initiated, which may have to be halted before the integrity of the data base is upset. That is, instruction pipeline 24 may include a number of stages wherein each stage may perform a specified function. For example, a first stage may generate an operand address, a second stage may fetch the operand, and the third stage may execute the instruction. These and other hardware sequences may have to be halted to prevent the garbage instruction from affecting the state of the machine. A further discussion of a typical instruction pipeline 24 is provided with reference to FIG. 3.

Since instruction control 12 may not be notified of a cache miss until after the garbage instruction is clocked into instruction pipeline 24, a number of clock cycles may be required to de-pipe instruction pipeline 24 and stop the number of hardware sequences that the garbage instruction has initiated. Instruction control 12 may initiate this recovery process via interface 30. It is readily apparent that a substantial amount of recovery hardware may be required to support this recovery process.

Once instruction control 12 is notified of the cache miss via interface 36, instruction control 12 may request to read a block of instructions, including the requested instruction, from main memory 38 via interface 42. This may require arbitration for access to main memory 38. Once the requested block of instructions are read into instruction cache memory 16, and instruction address pipeline 14 and instruction pipeline 24 are fully recovered as described above, instruction cache memory 16 may provide the requested instruction to instruction pipeline 24 via interface 26.

Figure 2:
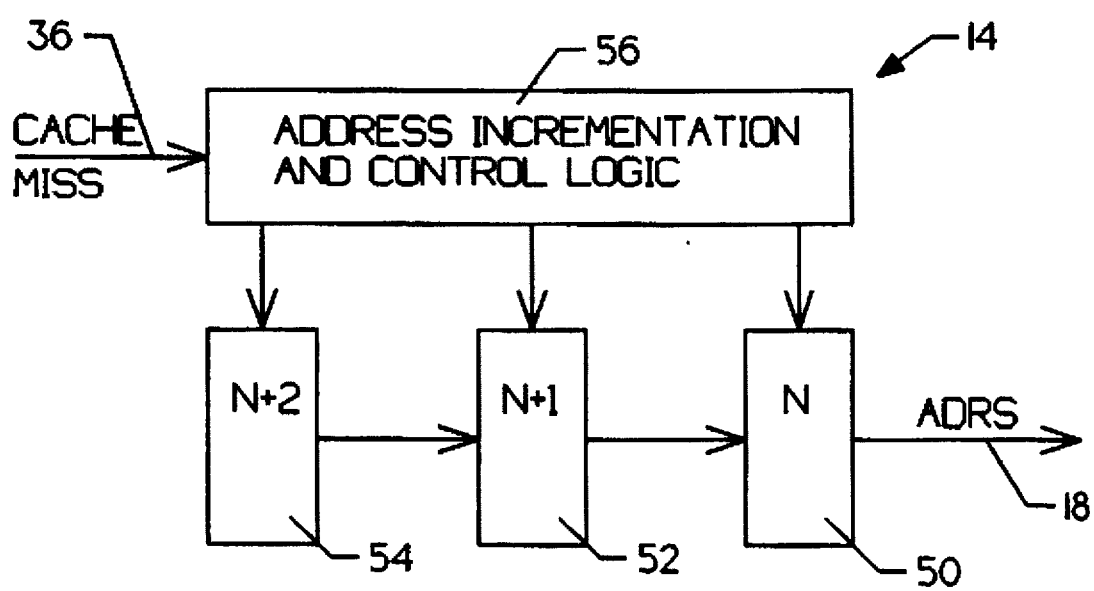
FIG. 2 is a block diagram showing the general construction of a typical instruction address pipeline with address incrementation.

FIG. 2 is a block diagram showing the general construction of a typical instruction address pipeline 14 with address incrementation. As indicated with reference to FIG. 1, instruction address pipeline 14 may prefetch instruction addresses and stage the instruction addresses for execution. In a typical prior art system, instruction address pipeline 14 may stage a current instruction address 50 (indicated as N), and an address incrementation function may generate two subsequent instruction addresses 52 and 54 (indicated as N+1 and N+2). Address incrementation and control logic block 56 may control the sequence of instruction addresses within instruction address pipeline 14. This may include calculating the proper instruction addresses subsequent to a jump instruction or other non-sequential instruction.

It can readily be seen that if instruction address pipeline 14 does not receive a cache miss signal 36 before the addresses in blocks 50, 52, and 54 are clocked into the subsequent stage, a number of clock cycles may be required to resynchronize instruction address pipeline 14 with the rest of the system. The resychnonization of instruction address pipeline 14 may require a number of clock cycles to de-pipe instruction address pipeline 14 and reload the proper addresses therein. Further, a substantial amount of support hardware may be required to support the resycnronization of address pipeline 14.

Figure 3:
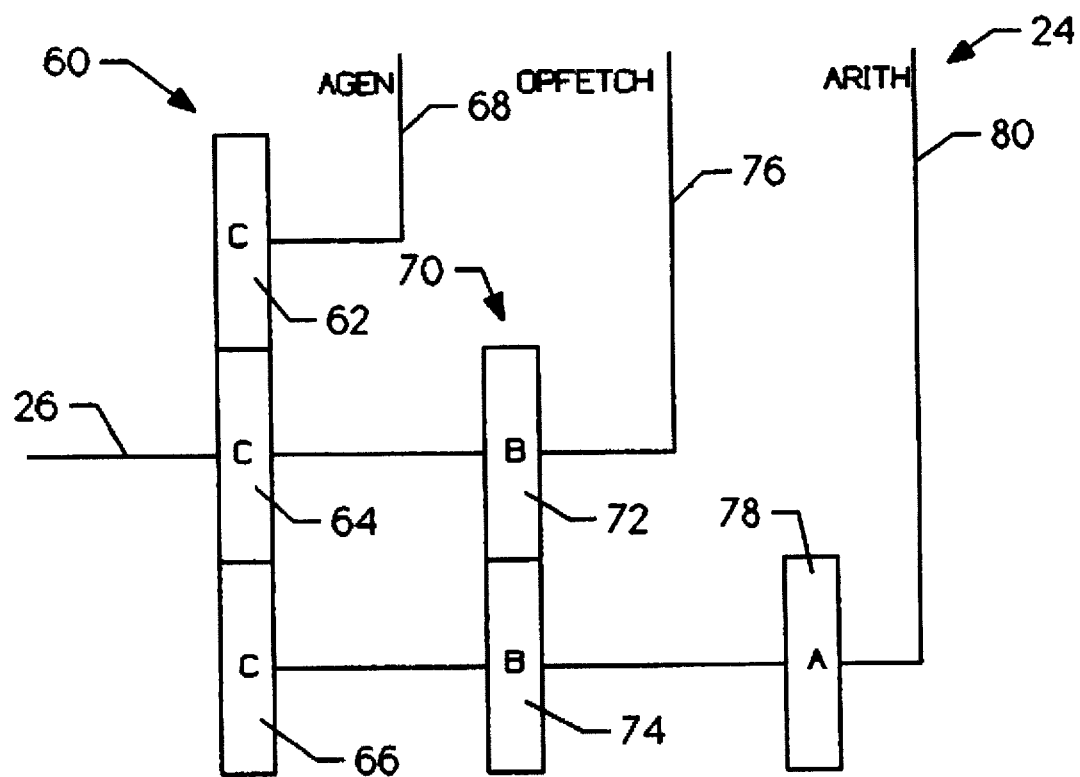
FIG. 3 is a schematic diagram showing the general control scheme for a three position instruction pipeline.

FIG. 3 is a schematic diagram showing the general control scheme for a three position instruction pipeline 24. Microcode instructions may be supplied from instruction cache memory 16 via interface 26 (see also FIG. 1). Instruction pipeline 24 may include a first stage 60, a second stage 70, and a third stage 78. Instruction C may contain first portion 62, a second portion 64, and a third portion 66. The first portion 62 may control operand address generation AGEN 68 at the first stage 60 of instruction pipeline 24. The second portion 64 may control operand fetch OPFETCH 76 at the second stage 70 of instruction pipeline 24. The third portion 66 may control instruction execution ARITH 80 at the third stage 78 of instruction pipeline 24. Note that at the first stage 60, portion 62 is actually in control of AGEN 68. Portions 64 and 66, on the other hand, are staged or stored for use during later clock cycles.

Portion 72 of instruction B is in control of OPFETCH 76 and portion 74 is staged for control of ARITH 80 at a later clock cycle (i.e. probably the next clock cycle). That portion of instruction B which controls AGEN 68 has completed its function during the previous clock cycle and has therefore been discarded.

Portion 78 of instruction A is in control of ARITH 80. The remaining two portions of instruction A have been discarded as their control functions were accomplished during previous clock cycles. At the completion of the arithmetic function specified by portion 78, the resultant may be stored in a General Register Stack (GRS) as appropriate.

This GRS storage operation may be aborted as a result of the AGEN function of instruction C or as a result of the AGEN or OPFETCH functions of instruction B. Thus, there may be an interdependency between instructions A, B, and C. This interdependency may cause significant problems within a system of a garbage instruction is clocked into the instruction pipeline 24. That is, if a garbage instruction clocked into the first stage 60 of instruction pipeline 24, the status of the instructions in the second stage 70 and the third stage 78 are unknown. If instruction A 78 inadvertently writes a value to the general register stack (GRS) because of a garbage instruction C, the integrity of the data base within the machine may be compromised. This illustrates one reason for perform a recovery process of instruction pipeline 24 after a garbage instruction is clocked therein.

Figure 4:
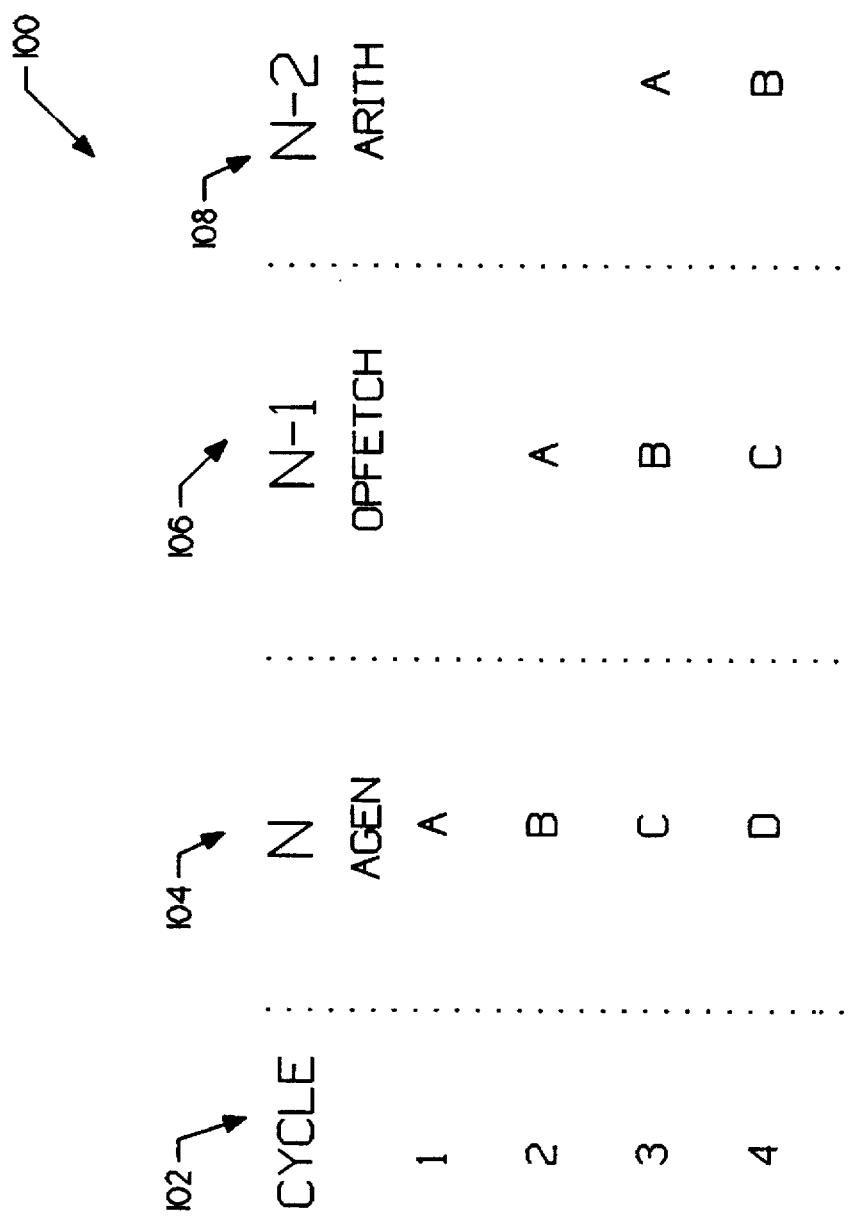
FIG. 4 is a timing diagram showing the general operation of a three position instruction pipeline.

FIG. 4 is a timing diagram showing the general operation of a three position instruction pipeline. The diagram is generally shown at 100. Column 102 uniquely identifies the four clock cycles by number, which are used in the present example. Column 104 identifies by clock cycle, the individual instruction designated A, B, C, and D, controlling the first stage of the pipeline (labeled AGEN). This first stage of the pipeline decodes the instruction and generates the operand address (see also FIG. 3). Column 106 identifies by clock cycle, the individual instruction controlling the second stage of the pipeline (labeled OPFETCH). Similarly, column 108 identifies by clock cycle, the instruction that is in control of the third stage of the pipeline (i.e. ARITH).

For instruction A, the instruction decode and operand address generation functions are performed during clock cycle 1. The operand for instruction A is fetched at clock cycle 2. At clock cycle 3, the arithmetic functions of instruction A are performed and the results are stored within the GRS as appropriate.

As can be seen in schematic diagram 100, a single instruction (e.g. instruction A) actually requires three clock cycles to complete. However, because each stage of the pipeline operates simultaneously, under ideal conditions, a different instruction completes arithmetic operations (see column 108) each clock cycle. This provides an effective instruction execution rate of one instruction per clock cycle.

To greatly simplify instruction development, the individual instructions (i.e. instructions A, B, C, and D) each may be self sufficient. That is each instruction may contain enough information to control each stage of the pipeline during the clock cycle in which that instruction is in control. This arrangement is called staged control in that control information not needed for a particular clock cycle is stored or "staged" for the next clock cycle. Staged control works particularly well when the instructions presented to the pipeline for execution are simple instructions requiring three clock cycles for completion.

However, often instructions are interdependent, as described with reference to FIG. 3. For example, for instructions causing a branch, the next sequential instruction is not executed. If the Nth instruction is a skip instruction and the skip is taken, the N+2nd instruction rather than the N+1st instruction is the next instruction to be executed. If the Nth instruction is a conditional jump instruction, the instruction at the target address is the next to be executed if the conditions are met. The target address always specifies the next instruction for unconditional jumps.

In many of these situations, the next instruction is at the target address and in a large number of these cases, the location of the next instruction to be executed is not completely known until completion of execution of the present instruction. If the system must complete execution of the Nth instruction before the N+1st or target instruction is fetched, the system must be depiped or otherwise with the corresponding degradation of performance.

Thus, it can be seen that a garbage instruction may cause the status of the instructions in the second stage and the third stage to be unknown. If instruction A inadvertently writes a value to the general register stack (GRS) because of a garbage instruction C, the integrity of the data base within the machine may be compromised. This illustrates the need to perform the recovery process of instruction pipeline 24 after a garbage instruction is clocked into the instruction pipeline 24.

Figure 5:
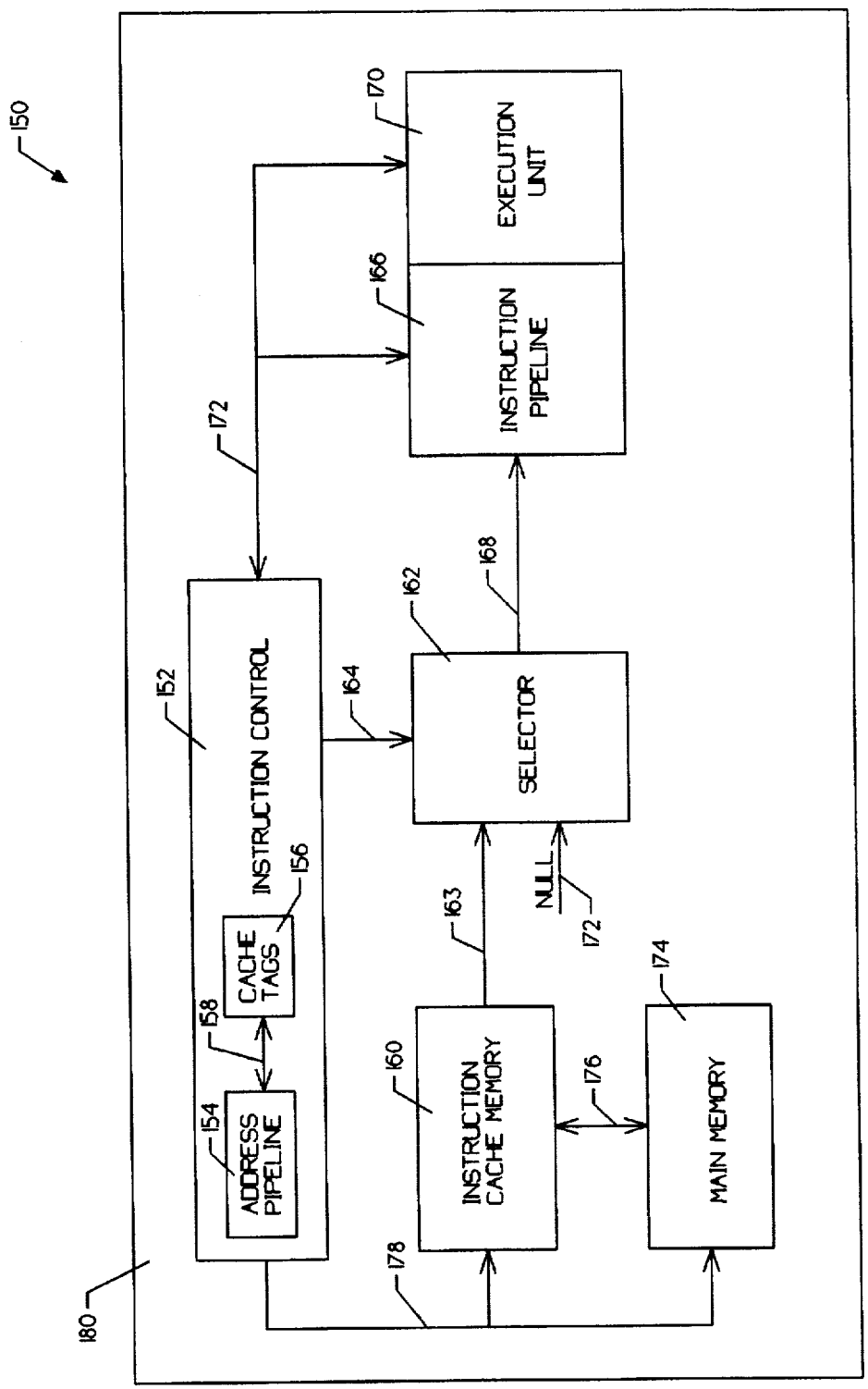
FIG. 5 is a block diagram of a first exemplary embodiment of the present invention.

FIG. 5 is a block diagram of a first exemplary embodiment of the present invention. The diagram is generally shown at 150. The present invention overcomes many of the disadvantages found in the prior art by providing a method of and apparatus for efficiently halting the operation of the instruction processor when a cache miss is detected. Generally, this is accomplished by preventing unwanted address incrementation of an instruction address pipeline and by providing a null instruction to an instruction pipeline, via a selector means, when a cache miss is detected. Accordingly, the present invention may eliminate a recovery period after a cache miss is detected, thereby enhance the performance of the data processing system. Further, the present invention may eliminate recovery hardware required to support the recovery process.

In the exemplary embodiment, an instruction control unit 152 may be provided to control the sequence that instructions are provided to instruction pipeline 166 and execution unit 170. As indicated with reference to FIG. 1, instruction control unit 152 may includes an instruction address pipeline 154.

Instruction address pipeline 154 may prefetch instruction addresses and stage the instruction addresses for execution. In the exemplary embodiment, instruction address pipeline 154 may stage a current instruction address (N), and an address incrementation function may generate two subsequent instruction addresses (N+1 and N+2). Instruction address pipeline 154 may further calculate the proper instruction addresses subsequent to a jump instruction or other non-sequential instruction.

Because main memory 174 may be relatively slow, particularly in system using a hierarchical memory architecture where a number of users may request access to main memory 174, instruction cache memory 160 is provided. Instruction cache 160 includes an instruction cache memory portion and an instruction cache tags portion 156. Instruction cache tags portion 156 is a memory containing the valid instruction addresses of instruction cache memory 160, thereby indicating which instructions reside in instruction cache memory 160. Thus, by searching the instruction cache tags portion 156, instruction control 152 may determine if a requested instruction is present in the instruction cache memory 160.

Address pipeline 154 provides the address of the next sequential instruction to instruction cache tags portion 156 via interface 158, and to instruction cache memory 160 via interface 178. Instruction cache tags portion 156 is searched to determine if the requested instruction resides in instruction cache memory 160. If the requested instruction resides in instruction cache memory 160, the requested instruction is provided to selector 162 via interface 163. Selector 162 is controlled by instruction control 152 via interface 164, and selects either the instruction provided by instruction cache memory 160 or a null instruction provided on interface 172. Prior to receiving a cache miss signal from instruction cache tags portion 156, selector 162 selects the output of instruction cache memory 160. Thus, the requested instruction is provided from instruction cache memory 160 to instruction pipeline 166.

If, however, the requested instruction is not resident in instruction cache memory 160, instruction cache tags portion 156 provides a cache miss signal. The cache miss signal is provided directly to instruction control 152 and address pipeline 154, as shown. In the exemplary embodiment, instruction cache tags portion 156 is physically located in instruction control 152, rather than in instruction cache memory 160. Further, instruction cache tags portion 156 is directly coupled to address pipeline 154, via interface 158. The physical placement of instruction cache tags portion 156 enables the cache miss signal to arrive at instruction address pipeline 154 in sufficient time to halt unwanted address incrementation therein. Further, the cache miss signal is provided to selector 162 via interface 164 in sufficient time to prevent a garbage instruction from being provided from instruction cache memory 160 to instruction pipeline 166 (see below). It is contemplated that instruction address pipeline 154 and instruction cache tags portion 154 may be physically located on the same substrate.

As indicated above, selector 162 may be provided between instruction cache memory 160 and instruction pipeline 166. Selector 162 may be controlled by a number of signals, including the cache miss signal provided by instruction control 152 via interface 164. As indicated above, in the absence of a cache miss signal, selector 162 may select the output of instruction cache memory 160, such that instructions may be read directly from instruction cache memory 160 to instruction pipeline 166. However, when a cache miss is detected, selector 162 may select a null instruction 172 and provide the null instruction to instruction pipeline 166. In contrast to a garbage instruction, null instruction 172 may not start any hardware sequences within the system, and therefore may not require a recovery sequence, and thus no extra logic to abort the recovery sequences. In a preferred embodiment, the null instruction is an all zeros instruction.

Once instruction control 152 is notified of the cache miss, and selector 162 selects the null instruction 172, instruction control 152 may request to read a block of instructions, including the requested instruction, from main memory 174 via interface 178. This may require arbitration for access to main memory 174. After the requested block of instructions are read into instruction cache memory 160 via interface 176, instruction control 152 directs selector 162 to select the output of instruction cache memory 160 such that the requested instruction is provided to instruction pipeline 166. It is contemplated that the logic shown in FIG. 5 may be provided on a single physical substrate 180 to further enhance the performance thereof.

Providing the above referenced selector 162, and by locating the cache memory tags portion 156 near instruction address pipeline 154 with a direct cache miss signal 158 therebetween, the requested instructions may be provided to the instruction pipeline 166 as soon as they become available. This may be accomplished because clock cycles are not wasted due to recovery or resynchronization of the system. Accordingly, a significant performance enhancement may be achieved.

Figure 6:
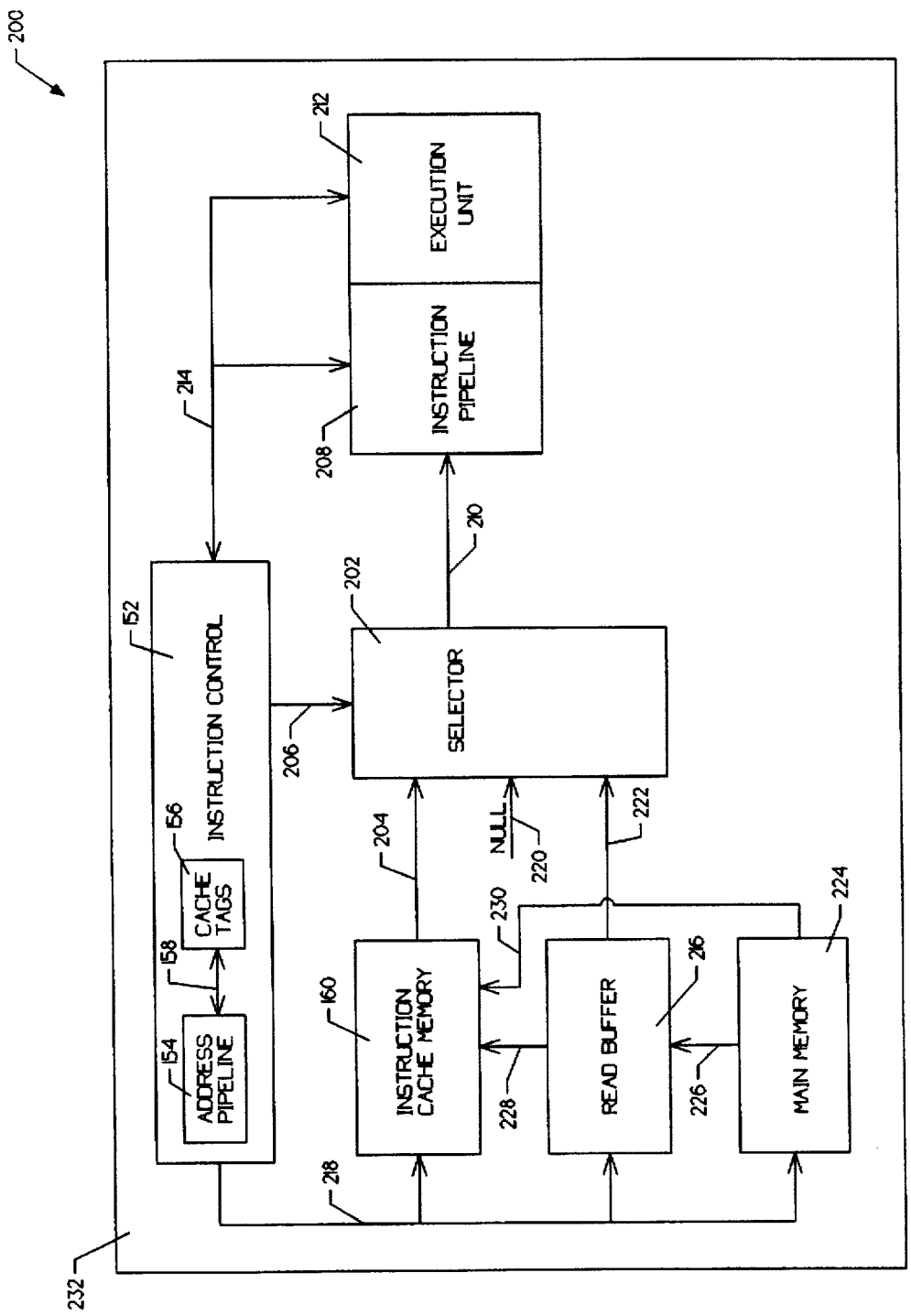
FIG. 6 is a block diagram of a second exemplary embodiment of the present invention.

FIG. 6 is a block diagram of a second exemplary embodiment of the present invention. The diagram is generally shown at 200. The second exemplary embodiment is similar to the first exemplary embodiment of FIG. 5, except a read buffer may be provided between main memory 224 and instruction cache memory 160. The read buffer may be in accordance with U.S. Pat. No. 5,423,016, entitled "Block Buffer for Instruction/Operand Caches", which is incorporated herein by reference.

As indicated with reference to FIG. 5, an instruction control unit 152 may be provided to control the sequence that instructions are provided to instruction pipeline 208 and execution unit 212. Instruction control unit 152 may includes an instruction address pipeline 154. Instruction address pipeline 154 may prefetch instruction addresses and stage the instruction addresses for execution. In the exemplary embodiment, instruction address pipeline 154 may stage a current instruction address (N), and an address incrementation function may generate two subsequent instruction addresses (N+1 and N+2). Instruction address pipeline 154 may further calculate the proper instruction addresses subsequent to a jump instruction or other non-sequential instruction.

Because main memory 224 may be relatively slow, particularly in system using a hierarchical memory architecture where a number of users may request access to main memory 224, instruction cache memory 160 is provided. Further, a read buffer 216 may be provided between main memory 224 and instruction cache memory 160. It is contemplated that during initialization of predetermined subroutines, instruction cache memory 160 may be loaded from memory 224 via interface 230. It is also contemplated that read buffer 216 may be preloaded with instructions from main memory 224 via interface 226.

Instruction cache 160 may include an instruction cache memory portion 160 and an instruction cache tags portion 156. Instruction cache tags portion 156 is a memory containing the valid addresses within instruction cache memory 160, thereby indicating which instructions reside in instruction cache memory 160. Thus, by searching the instruction cache tags portion 156, instruction control 152 may determine if a requested instruction is present in the instruction cache memory 160.

Although not explicitly shown, it is contemplated that read buffer 216 may comprise a data portion and a tags portion. Instruction control 152 may search the read buffer tags portion via interface 218 to determine if a requested instruction is resident within read buffer 216. It is contemplated that instruction cache tags portion 156 may service both instruction cache memory 160 and read buffer 216.

Address pipeline 154 provides the address of the next sequential instruction to instruction cache tags portion 156 via interface 158, instruction cache memory 160 via interface 218, and read buffer 216 via interface 218. Initially, instruction cache tags portion 156 is searched to determine if the requested instruction resides in the instruction cache memory 160. This also may include searching the read buffer tags portion, as is discussed in more detail below. If the requested instruction resides in instruction cache memory 160, the requested instruction is provided to selector 202 via interface 204. Selector 202 is controlled by instruction control 152 via interface 206, and selects between the instruction provided by instruction cache memory 160, a null instruction on interface 220, and the output of read buffer 216. Prior to receiving a cache miss signal from instruction cache tags portion 156, selector 202 selects the output of instruction cache memory 160. Thus, the requested instruction is provided from instruction cache memory 160 to instruction pipeline 208.

If the requested instruction is not resident in instruction cache memory 160, instruction cache tags portion 156 provides a cache miss signal. The cache miss signal is provided directly to instruction control 152 and address pipeline 154, as shown. In the exemplary embodiment, instruction cache tags portion 156 is physically located in instruction control 152, rather than in instruction cache memory 160. Further, instruction cache tags portion 156 is directly coupled to address pipeline 154, via interface 158. The physical placement of instruction cache tags portion 156 enables the cache miss signal to arrive at instruction address pipeline 154 in sufficient time to halt unwanted address incrementation therein. Further, the cache miss signal is provided to selector 202 via interface 206 in sufficient time to prevent a garbage instruction from being provided from instruction cache memory 160 to instruction pipeline 208 (see below). It is contemplated that instruction address pipeline 154 and instruction cache tags portion 154 may be physically located on the same substrate.

In accordance with the above, selector 202 may select the output of instruction cache memory 160 during normal operation as described above. However, when a cache miss is detected by instruction cache tags portion 156, selector 202 may select the null instruction. Thereafter, instruction control may search the read buffer tags portion to determine of the requested instruction resides in read buffer 216. If instruction cache tags portion 156 services both instruction cache memory 160 and read buffer 216, this may be accomplished while searching the instruction cache tags portion, as indicated above. In either case, if the requested instruction resides in read buffer 216, selector 202 may select the output of read buffer 216, thereby providing the requested instruction to instruction pipeline 208.

If the requested instruction does not reside in either instruction cache memory 160 or read buffer 216, instruction control 152 may direct selector to select null instruction 220. Meanwhile, a block of instructions containing the requested instruction may be read from main memory 224 to read buffer 216, beginning with the requested instruction first. Once the requested instruction is available in read buffer 216, selector 202 may select the output of read buffer 202, wherein the requested instruction may be provided to instruction pipeline 208. This may occur in parallel with the transfer of the remaining instructions in the requested block of instructions to read buffer 216.

If a subsequent instruction is also within the requested block of instructions being provided to read buffer 216, selector 202 may select the null instruction 220 input until the subsequent instruction becomes available in read buffer 216. If a subsequent instruction is in instruction cache memory 160, selector 202 may select the output of instruction cache memory 160 to provide the desired instruction to instruction pipeline 208. Thus, selector 202 may select the appropriate instruction source to receive a requested instruction, and may select a null instruction 220 when the requested instruction is not available from any of the instruction sources.

It is contemplated that the present contents of read buffer 216 may be loaded into instruction cache memory 160, particularly when a subsequent cache miss is detected. That is, when a subsequent cache miss is detected, rather than discarding the present contents of read buffer 216, the contents may be loaded into instruction cache memory 160. It is further contemplated that a no save designator (see FIG. 7) may be provided for preventing predetermined blocks of data within read buffer 216 from being loaded into instruction cache memory 160. This may prevent data that is not likely to be accessed soon from displacing data currently present in instruction cache memory 160. Finally, it is contemplated that the logic shown in FIG. 6 may be provided on a single physical substrate 232 to further enhance the performance thereof.

Providing the above referenced selector 202, read buffer 216, and by locating instruction cache tags portion 156 near the instruction address pipeline with a direct cache miss signal therebetween, allows requested instructions to be provided to instruction pipeline 208 as soon as they become available. This may be accomplished because clock cycles are not wasted due to recovery or resynchronization of the system. Accordingly, a significant performance enhancement may be achieved over prior art systems.

Figure 7:
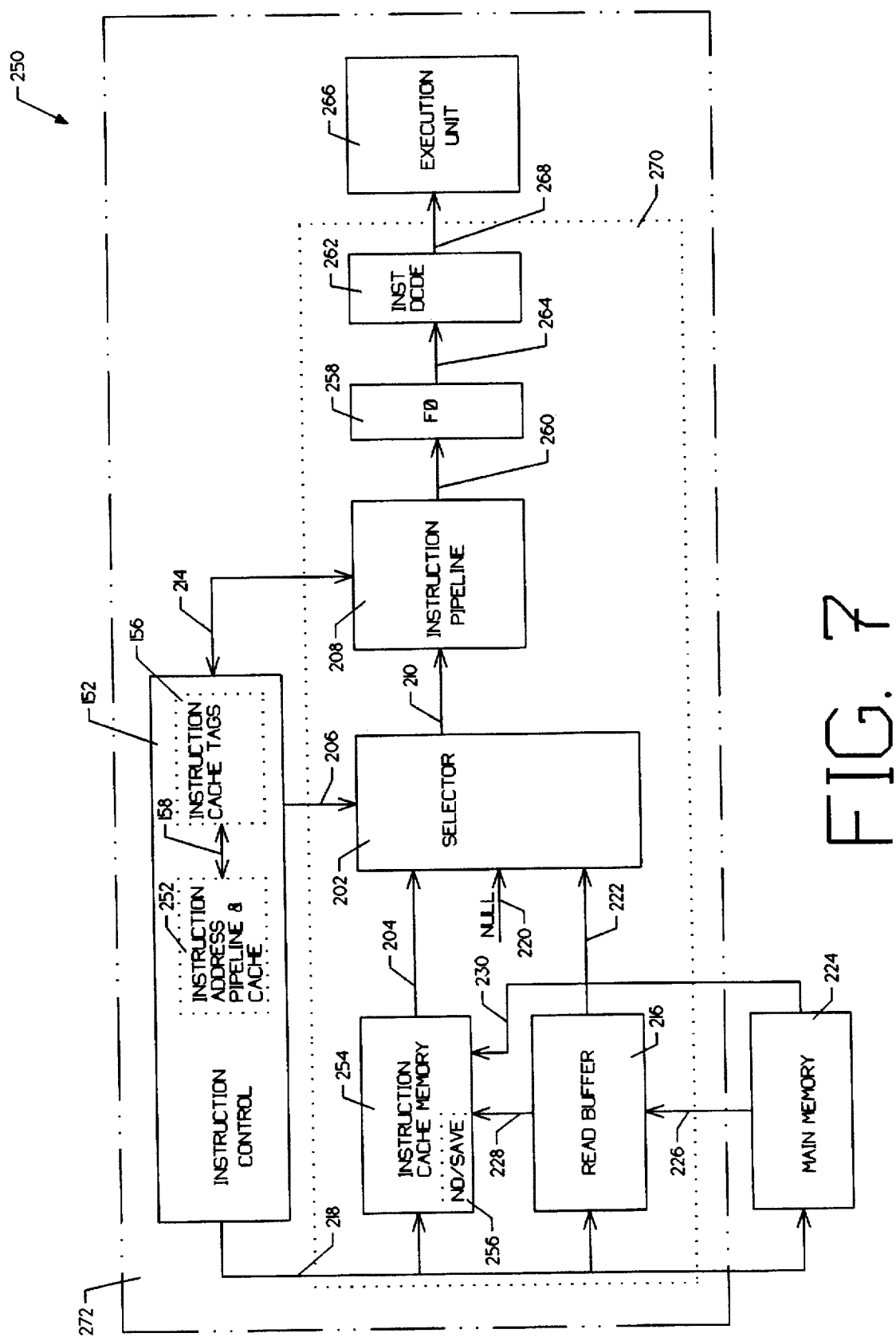
FIG. 7 is a block diagram of a preferred embodiment of the present invention.

FIG. 7 is a block diagram of a preferred embodiment of the present invention. The diagram is generally shown at 250. The general system architecture may be in accordance with U.S. Pat. No. 5,434,986, entitled "Interdependency Control of Pipelined Instruction Processor Using Comparing Result of Two Index Registers of Skip Instruction and next Sequential Instruction", U.S. patent application Ser. No. 08/288,651, entitled "Cooperative Hardware and Microcode Control System for Pipelined Instruction Execution", and U.S. patent application Ser. No. 07/762,276, entitled "Data Coherency Protocol for Multi-Level Cached High Performance Multiprocessor System", all incorporated herein by reference.

The operation of the preferred embodiment shown in FIG. 7 is substantially similar to that described with reference to FIG. 6. However, an F0 register 258 and an instruction decode block 262 are provided between the instruction pipeline 208 and execution unit 266. Further, a no/save designator 256 is provided in instruction cache memory 254.

With regard to the no/save designator 256, a no/save designator flag may be set for predetermined data blocks of instruction that are not likely to be accessed in the near future. The no/save designator 256 may conditionally prevent such blocks of instructions from displacing instructions currently present in instruction cache memory 254. For example, certain instruction processor functions such as block transfers, dayclock reads, accelerate General Register Set (GRS), etc. may not be accessed very often. Thus, instruction cache memory 254 need not be disturbed by writing these instructions therein. A further discussion of the no/save designator may be found in U.S. Pat. No. 5,423,016, entitled "Block Buffer for Instruction/Operand Caches", which is incorporated herein by reference.

With regard to the F0 register, it is contemplated that F0 register 258 may be coupled to the output of instruction pipeline 208 via interface 260. Instruction decode block 262 may be coupled to the output of F0 register 258 via interface 264. The output of instruction decode block 262 may be coupled to execution unit 266 via interface 268. In the exemplary embodiment, F0 register 258 may capture the output of instruction pipeline 208. Instruction pipeline 208 may be a single pipeline stage. The instructions captured by F0 register 258 may be decoded by instruction decode block 262. The decoded instructions provided by instruction decode block 262 may then be provided to execution unit 266 as shown.

Finally, it is contemplated that all logic shown within block 270 may be provided on a single substrate. Further, it is contemplate that all logic shown within block 272 may be provided on a signal printed circuit board.

Figure 8:
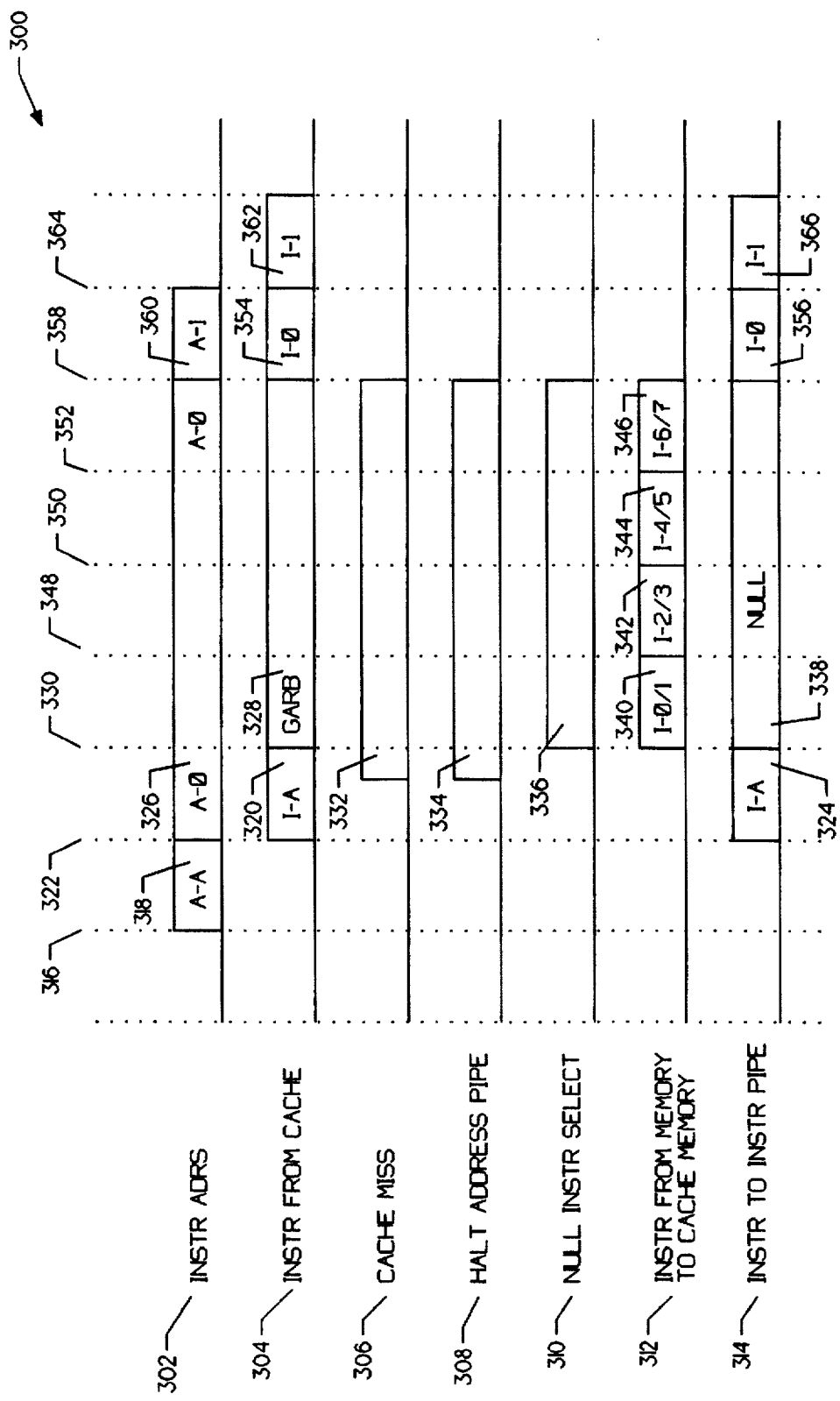
FIG. 8 is a thing diagram showing an exemplary operation of the first exemplary embodiment of the present invention.

FIG. 8 is a timing diagram showing an exemplary operation of the first exemplary embodiment of the present invention. The timing diagram is generally shown at 300, and should be read in conjunction with FIG. 5.

A brief description of seven (7) signals are shown along the left side of the diagram. The instruction address (INST ADRS) signal 302 corresponds to the address provided by instruction address pipeline 154 (see FIG. 5) via interface 178. The instruction from cache (INSTR FROM CACHE) signal 204 corresponds to the instruction provided by instruction cache memory 160 on interface 163. The cache miss (CACHE MISS) signal 306 corresponds to the cache miss signal provided by instruction cache tags portion 156 via interface 158. The halt address pipeline (HALT ADDRESS PIPE) signal 308 corresponds to the a signal internal to instruction address pipeline 154 that halts address incrementation of instruction address pipeline 154. The halt address pipeline signal 308 may be generated from the cache miss signal 306. The null instruction select (NULL INSTR SELECT) signal 310 corresponds to the control signals provided to selector 162 via interface 164, and is asserted high when selector selects the null instruction on interface 172. The instruction from memory to cache memory (INSTR FROM MEMORY TO CACHE MEMORY) signal 312 corresponds to the instructions provided from main memory 174 to instruction cache memory 160 via interface 176. Finally, the instruction to instruction pipeline (INSTR TO INSTR PIPE) signal 314 corresponds to the instruction provided by selector 162 to instruction pipeline 166 via interface 168.

At time 316, instruction address pipeline 154 may provide an address of A—A on INSTR ADRS 302 as shown at 318. The first "A" in this nomenclature indicates that an address is provided, and the second "A" represents the address value. Since CACHE MISS 306 is not asserted, it is apparent that the instruction corresponding to address "A" is present in instruction cache memory 160. Thus, instruction cache memory 160 provides the instruction corresponding to address "A" (I-A) on INSTR FROM CACHE 304 at time 322, as shown at 320. Further, instruction control 152 directs selector 162 to select the output of instruction cache memory 160, as shown by the de-asserted NULL INSTR SELECT 310. Thus, selector 162 provides the instruction corresponding to address "A" (I-A) to instruction pipeline 166 on INSTR TO INSTR PIPE 314, as shown at 324.

At time 322, instruction address pipeline 154 may provide an address of A-0 on INSTR ADRS 302. However, in this case, CACHE MISS 306 is asserted as shown at 332, thereby indicating that the requested instruction is not within instruction cache memory 160. Immediately thereafter, the HALT ADDRESS PIPE signal 308 is asserted as shown at 334. This halts address incrementation in address pipeline 154. At time 330, instruction control 152 asserts NULL INSTR SELECT 310 as shown at 336, thereby directing selector 162 to select the null instruction provided on interface 172. At the same time, a garbage instruction is provided by instruction cache memory 160, as shown at 328. Thereafter, instruction control 152 requests that a block of instructions be read from main memory 174, beginning with the requested instruction. This is shown at 340, 342, 344, and 346.

The HALT ADDRESS PIPE signal 308 and NULL INSTR SELECT signal 310 remain asserted until the requested block of instructions are provided to instruction cache memory 160, as shown. Thus, at time 352 the INSTR ADRS signal remains at A-0. However, at time 358, the CACHE MISS signal 306, HALT ADDRESS PIPE signal 308, and the NULL INSTR SELECT signal 310 are all de-asserted. Thus, instruction cache memory 160 provides the instruction corresponding to address "0" (I-0) on INSTR FROM CACHE 304 as shown at 354. Further instruction control 152 directs selector 162 to select the output of instruction cache memory 160. Thus, selector 162 provides the instruction corresponding to address "0" (I-0) to instruction pipeline 166 on INSTR TO INSTR PIPE 314, as shown at 356.

At time 358, instruction address pipeline 154 may provide an address of A-1 on INSTR ADRS 302 as shown at 360. Since address "1" was loaded into instruction cache memory during the previous cache miss as shown at 340, the CACHE MISS signal 306 is not asserted. Thus, instruction cache memory 160 provides the instruction corresponding to address "1" (I-1) on INSTR FROM CACHE 304 at time 364, as shown at 362. Further instruction control 152 directs selector 162 to select the output of instruction cache memory 160, as shown by NULL INSTR SELECT 310. Thus, selector 162 provides the instruction corresponding to address "1" (I-1) to instruction pipeline 166 on INSTR TO INSTR PIPE 314, as shown at 366.

Figure 9:
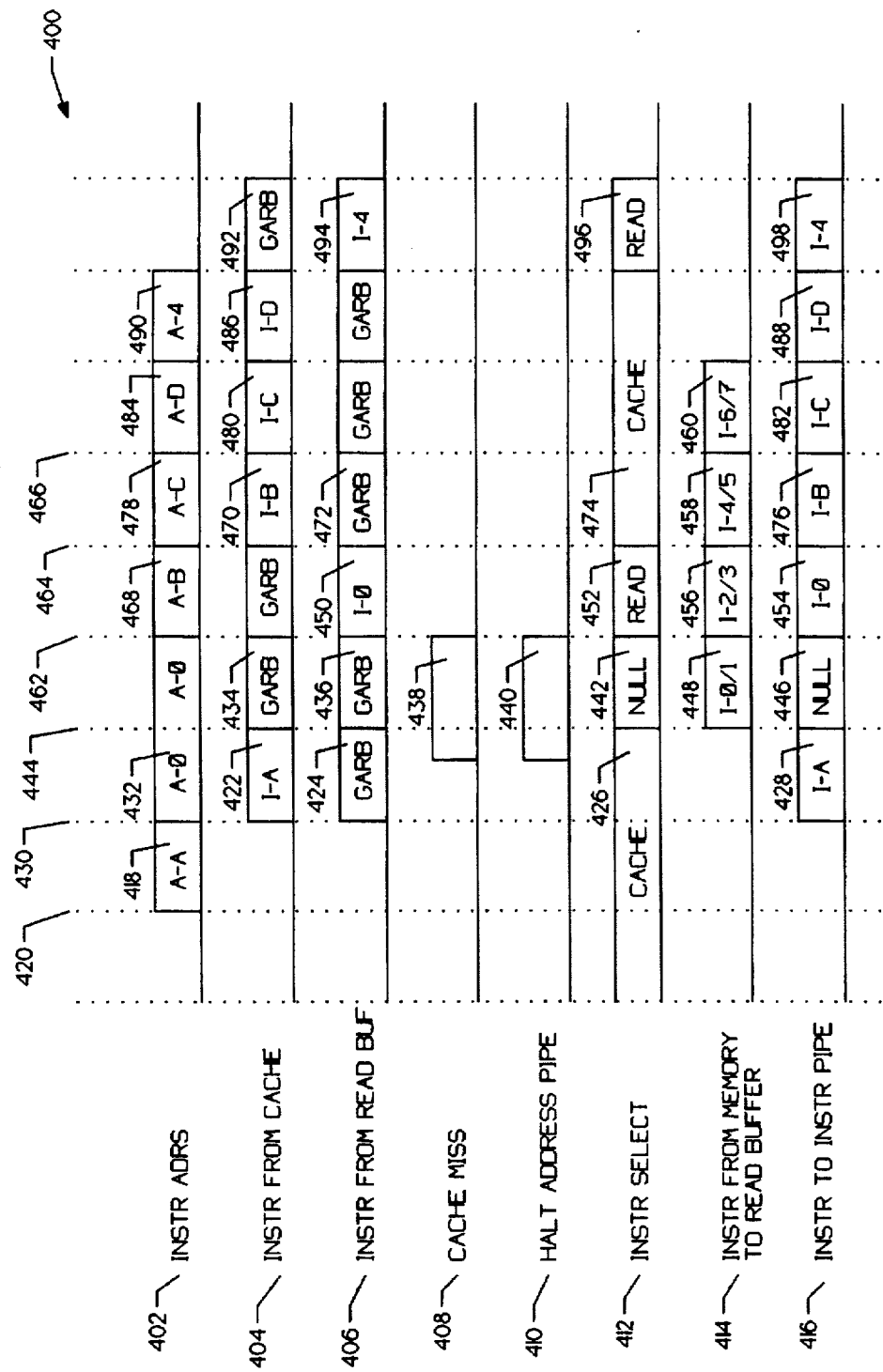
FIG. 9 is a thing diagram showing an exemplary operation of the second and/or third exemplary embodiments of the present invention.

FIG. 9 is a timing diagram showing an exemplary operation of the second and/or third exemplary embodiments of the present invention. The timing diagram is generally shown at 400, and should be read in conjunction with FIG. 6.

A brief description of eight (8) signals are shown along the left side of the diagram. The instruction address (INST ADRS) signal 402 corresponds to the address provided by instruction address pipeline 154 (see FIG. 6) via interface 218. The instruction from cache (INSTR FROM CACHE) signal 404 corresponds to the instruction provided by instruction cache memory 160 on interface 204. The instruction from read buffer (INSTR FROM READ BUF) signal 406 corresponds to the instruction provided by read buffer 216 on interface 222. The cache miss (CACHE MISS) signal 408 corresponds to the cache miss signal provided by instruction cache tags portion 156 via interface 158. The halt address pipeline (HALT ADDRESS PIPE) signal 410 corresponds to the a signal internal to instruction address pipeline 154 that halts address incrementation of instruction address pipeline 154. The halt address pipeline signal 410 may be generated from the cache miss signal 408. The instruction select (INSTR SELECT) signal 412 corresponds to the control signals provided to selector 202 via interface 206, and controls whether selector 202 selects the output of instruction cache memory 160, the null instruction on interface 172, or the output of read buffer 216. The instruction from memory to read buffer (INSTR FROM EMORY TO READ BUFFER) signal 414 corresponds to the instructions provided from main memory 224 to read buffer via interface 226. Finally, the instruction to instruction pipeline (INSTR TO INSTR PIPE) signal 416 corresponds to the instruction provided by selector 202 to instruction pipeline 208 via interface 210.

At time 420, instruction address pipeline 154 may provide an address of A—A on INSTR ADRS 402 as shown at 418.

The first "A" in this nomenclature indicates that an address is provided, and the second "A" represents the address value. Since CACHE MISS 408 is not asserted, it is apparent that the instruction corresponding to address "A" is present in instruction cache memory 160. Thus, instruction cache memory 160 provides the instruction corresponding to address "A" (I-A) on INSTR FROM CACHE 404 at time 430, as shown at 422. The instruction provided by read buffer 202 is a garbage instruction as shown at 424. Instruction control 152 directs selector 202 to select the output of instruction cache memory 160, as shown by INSTR SELECT 412 at 426. Thus, selector 202 provides the instruction corresponding to address "A" (I-A) to instruction pipeline 208 on INSTR TO INSTR PIPE 416, as shown at 428.

At time 430, instruction address pipeline 154 may provide an address of A-0 on INSTR ADRS 402 as shown at 432. However, in this case, CACHE MISS 408 is asserted as shown at 438, thereby indicating that the requested instruction is not within instruction cache memory 160. Immediately thereafter, the HALT ADDRESS PIPE signal 410 is asserted as shown at 440. This halts address incrementation in address pipeline 154. At time 444, instruction control 152 directs INSTR SELECT 412 to select the null instruction on interface 220, as shown at 442, thereby directing selector 202 to select the null instruction provided on interface 220. At the same time, a garbage instruction is provided by instruction cache memory 160, as shown at 434. Thereafter, instruction control 152 requests that a block of instructions be read from main memory 224, beginning with the requested instruction, to read buffer 216 via interface 226. This is shown at 448, 456, 458, and 460.

The HALT ADDRESS PIPE signal 440 and INSTR SELECT signal 412 remain asserted until the requested instruction is provided to read buffer 216, as shown. Thus, at time 444 the INSTR ADRS signal remains at A-0. However, at time 462, the CACHE MISS signal 408, HALT ADDRESS PIPE signal 410 are all de-asserted. Further, the INSTR SELECT signal directs selector 202 to select the output of read buffer 216, as shown at 452. Thus, read buffer 216 provides the instruction corresponding to address "0" (I-0) on INSTR FROM READ BUF signal 406, as shown at 450. Selector 202 provides the instruction corresponding to address "0" (I-0) to instruction pipeline 208 on INSTR TO INSTR PIPE 416, as shown at 454. Meanwhile, the remaining instructions in the requested block of instructions continue to be provided to read buffer 216, as shown at 456, 458, and 460.

At time 368, instruction address pipeline 154 may provide an address of A-B on INSTR ADRS 402 as shown at 468. Since CACHE MISS 408 is not asserted, it is apparent that the instruction corresponding to address "B" resides in instruction cache memory 160. Thus, instruction cache memory 160 provides the instruction corresponding to address "B" (I-B) on INSTR FROM CACHE 404 at time 464, as shown at 470. Further, instruction control 152 directs selector 202 to select the output of instruction cache memory 160, as shown by INSTR SELECT 412 at 474. Thus, selector 202 provides the instruction corresponding to address "B" (I-B) to instruction pipeline 208 on INSTR TO INSTR PIPE 416, as shown at 476.

At time 464, instruction address pipeline 154 may provide an address of A–C on INSTR ADRS 402 as shown at 478. Since CACHE MISS 408 is not asserted, it is apparent that the instruction corresponding to address "C" resides in instruction cache memory 160. Thus, instruction cache memory 160 provides the instruction corresponding to address "C" (I-C) on INSTR FROM CACHE 404 at time 466, as shown at 480. Further, instruction control 152 directs selector 202 to select the output of instruction cache memory 160, as shown by INSTR SELECT 412 at 474. Thus, selector 202 provides the instruction corresponding to address "C" (I-C) to instruction pipeline 208 on INSTR TO INSTR PIPE 416, as shown at 482.

At time 466, instruction address pipeline 154 may provide an address of A–D on INSTR ADRS 402 as shown at 484. Since CACHE MISS 408 is not asserted, it is apparent that the instruction corresponding to address "D" resides in instruction cache memory 160. Thus, instruction cache memory 160 provides the instruction corresponding to address "D" (I-D) on INSTR FROM CACHE 404 as shown at 486. Further, instruction control 152 directs selector 202 to select the output of instruction cache memory 160, as shown by INSTR SELECT 412 at 474. Thus, selector 202 provides the instruction corresponding to address "D" (I-D) to instruction pipeline 208 on INSTR TO INSTR PIPE 416, as shown at 488.

Finally, instruction address pipeline 154 may provide an address of A-4 on INSTR ADRS 402 as shown at 490. Since address "4" was loaded into read buffer 216 during the previous cache miss as shown at 458, the CACHE MISS signal 306 is not asserted. Thus, read buffer 216 provides the instruction corresponding to address "4" (I-4) on INSTR FROM READ BUF 406 as shown at 494. Further, instruction control 152 directs selector 202 to select the output of read buffer 216, as shown by INSTR SELECT 412 at 496. Thus, selector 202 provides the instruction corresponding to address "4" (I-4) to instruction pipeline 208 on INSTR TO INSTR PIPE 416, as shown at 498.

Figure 10:
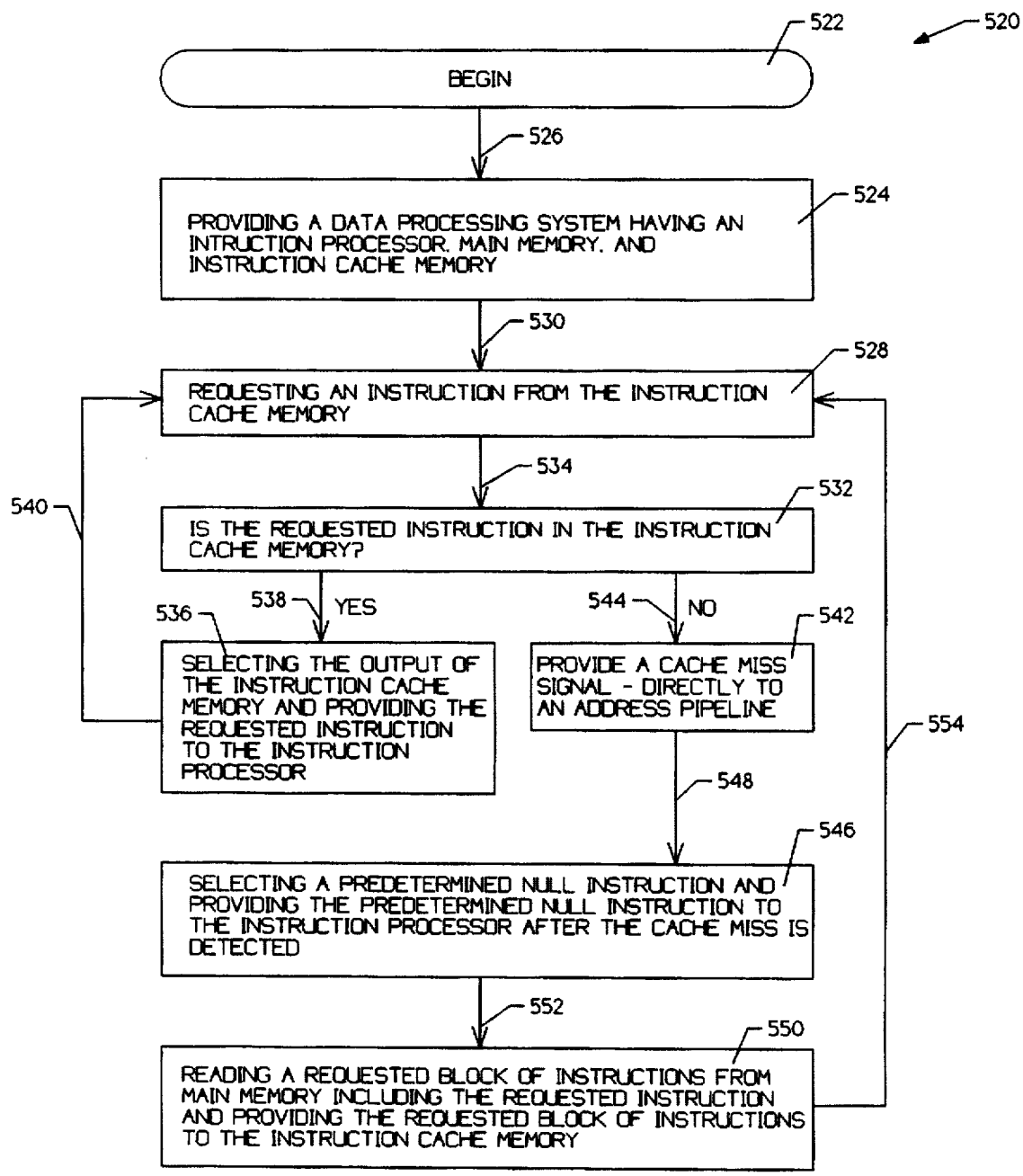
FIG. 10 is a flow diagram showing a first exemplary method of the present invention.

FIG. 10 is a flow diagram showing a first exemplary method of the present invention. The diagram is generally shown at 520. The algorithm is entered at element 522, wherein control is passed to element 524 via interface 526. Element 524 provides a data processing system having an instruction processor, main memory, and instruction cache memory. Control is then passed to element 528 via interface 530. Element 528 requests an instruction from the instruction cache memory. Control is then passed to element 532 via interface 534. Element 532 determines whether the requested instruction is in the instruction cache memory. If the requested instruction is in the instruction cache memory, control is passed to element 536 via interface 538. Element 536 selects the output of the instruction cache memory and provides the requested instruction to the instruction processor. Control is then passed back to element 528 via interface 540. If, however, the requested instruction does not reside in the instruction cache memory, control is passed to element 542 via interface 544.

Element 542 provides a cache miss signal. The cache miss signal may be provided directly to the addressed pipeline. Control is then passed to element 546 via interface 548. Element 546 selects a predetermined null instruction and provides the predetermined null instruction to the instruction processor after the cache miss is detected. Control is then passed to element 550 via interface 552. Element 550 reads a requested block of instructions from main memory, including the requested instruction, and provides the requested block of instructions to the instruction cache memory. Control is then passed back to element 528 via interface 554, wherein the instruction processor requests another instruction from the instruction cache memory.

Figure 11:
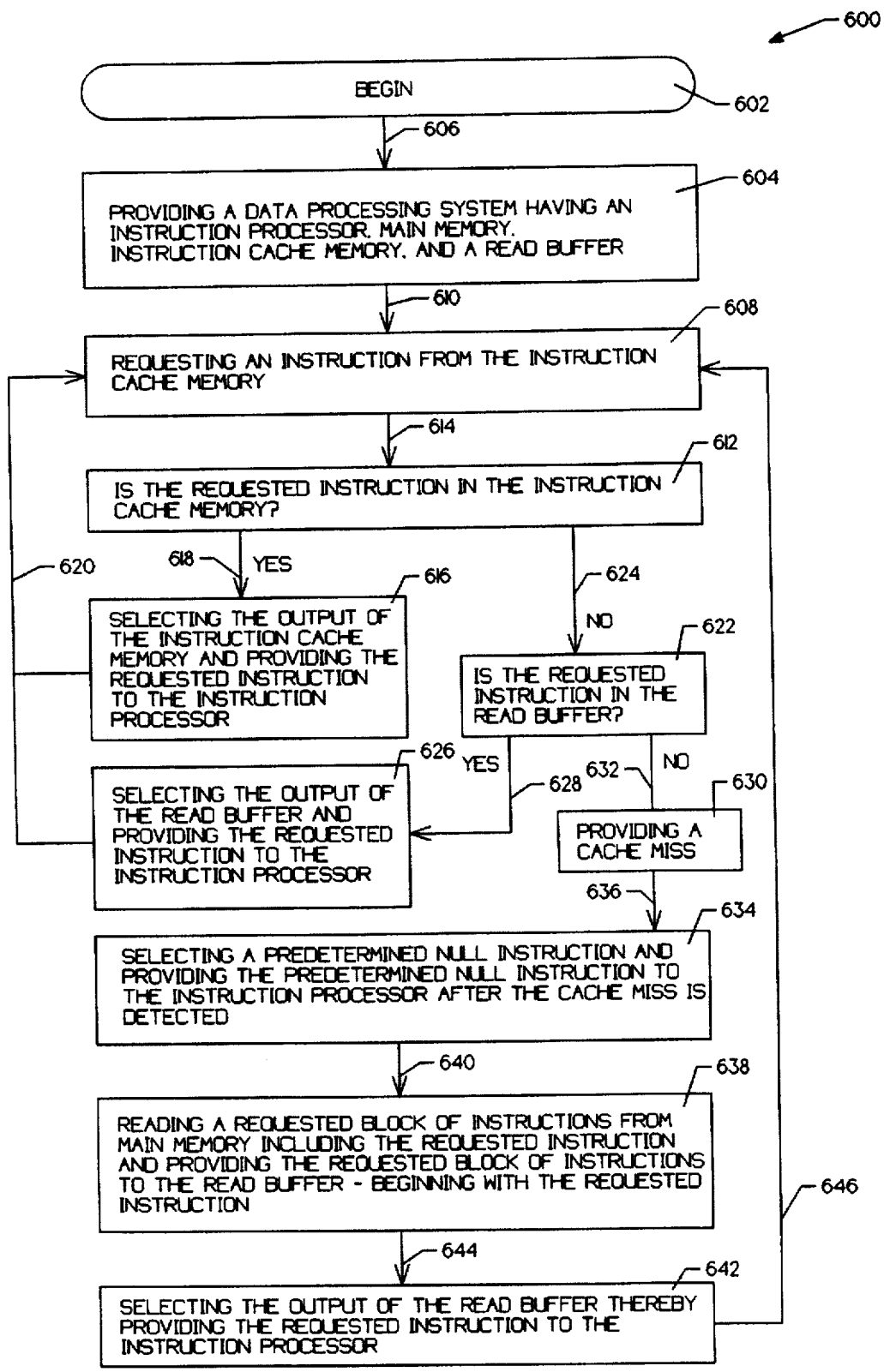
FIG. 11 is a flow diagram showing a second exemplary method of the present invention.

FIG. 11 is a flow diagram showing a second exemplary method of the present invention. The diagram is generally shown at 600. The algorithm is entered at element 602, wherein control is passed to element 604 via interface 606. Element 604 provides a data processing system having an instruction processor, main memory, instruction cache memory and a read buffer. Control is then passed to element 608 via interface 610. Element 608 requests an instruction from the instruction cache memory. Control is then passed to element 612 via interface 614. Element 612 determines whether the requested instruction resides in the instruction cache memory. If the requested instruction resides in the instruction cache memory, control is passed to element 616 via interface 618. Element 616 selects the output of the instruction cache memory and provides the requested instruction to the instruction processor. Control is then passed back to element 608 via interface 620.

If, however, the requested instruction does not reside in the instruction cache memory, control is passed to element 622 via interface 624. Element 622 determines whether the requested instruction resides in the read buffer. If the requested instruction does reside in the read buffer, control is passed to element 626 via interface 628. Element 626 selects the output of the read buffer and provides the requested instruction to the instruction processor. Control is then passed back to element 608 via interface 620. As indicated above, it is contemplated that element 622 and element 612 may be combined into a single step.

If the requested instruction does not reside in the read buffer, control is passed to element 630 via interface 632. Element 630 provides a cache miss signal. Control is then passed to element 634 via interface 636. Element 634 selects a predetermined null instruction, and provides the predetermined null instruction to the instruction processor after the cache miss is detected. Control is then passed to element 638 via interface 640. Element 638 reads a requested block of instructions from main memory, including the requested instruction and provides the requested block of instructions to the read buffer. The requested block of instructions may be provided to the read buffer, beginning with the requested instruction. Control is then passed to element 642 via interface 644. Element 642 selects the output of the read buffer, thereby providing the requested instruction to the instruction processor. Control is then passed back to element 608 via interface 646.

Figure 12:
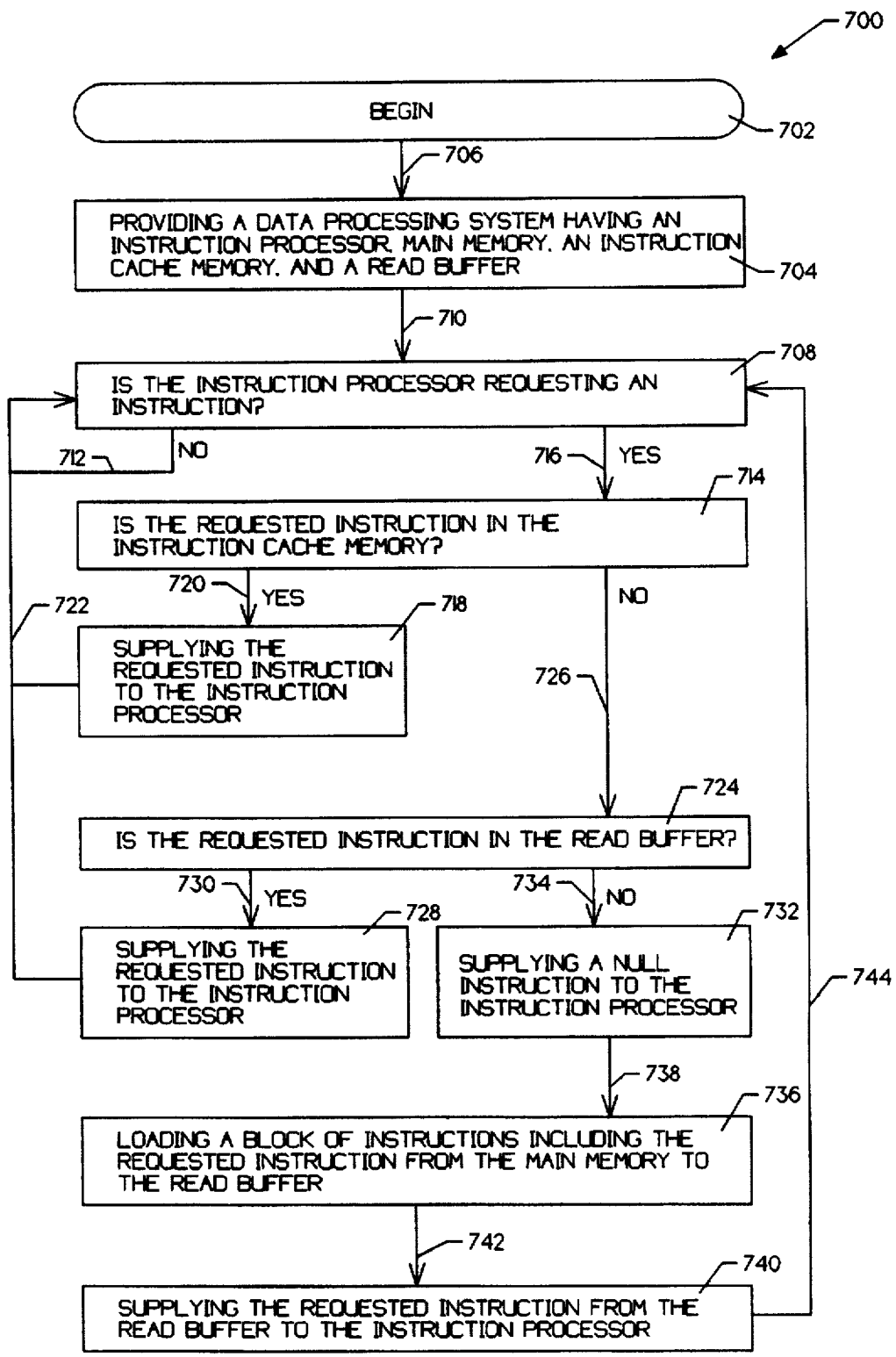
FIG. 12 is a flow diagram showing a third exemplary method of the present invention.

FIG. 12 is a flow diagram showing a third exemplary method of the present invention. The diagram is generally shown at 700. The algorithm is entered at element 702, wherein control is passed to element 704 via interface 706. Element 704 provides a data processing system having an instruction processor, main memory, an instruction cache memory, and a read buffer. Control is then passed to element 708 via interface 710. Element 708 determines whether the instruction processor is requesting an instruction. If the instruction processor is not requesting instruction, control is passed back to element 708 via interface 712. If the instruction processor is requesting an instruction, control is passed to element 714 via interface 716. Element 714 determines whether the requested instruction resides in the instruction cache memory. If the requested instruction resides in the instruction cache memory, control is passed to element 718 via interface 720. Element 718 supplies the requested instruction to the instruction processor. Control is then passed back to element 708 via interface 722.

If the requested instruction does not reside in the instruction cache memory, control is passed to element 724 via interface 726. Element 724 determines whether the requested instruction resides in the read buffer. If the requested instruction does reside in the read buffer, control is passed to element 728 via interface 730. Element 728 supplies the requested instruction to the instruction processor. Control is then passed back to element 708 via interface 722. As indicated above, it is contemplated that element 724 and element 714 may be combined into a single step.

If the requested instruction does not reside in the read buffer, control is passed to element 732 via interface 734. Element 732 supplies a null instruction to the instruction processor. Control is then passed to element 736 via interface 738. Element 736 loads a block of instructions, including the requested instruction, from the main memory to the read buffer. Control is then passed to element 740 via interface 742. Element 740 supplies the requested instruction from the read buffer to the instruction processor. Control is then passed back to element 708 via interface 744.

Figure 13:
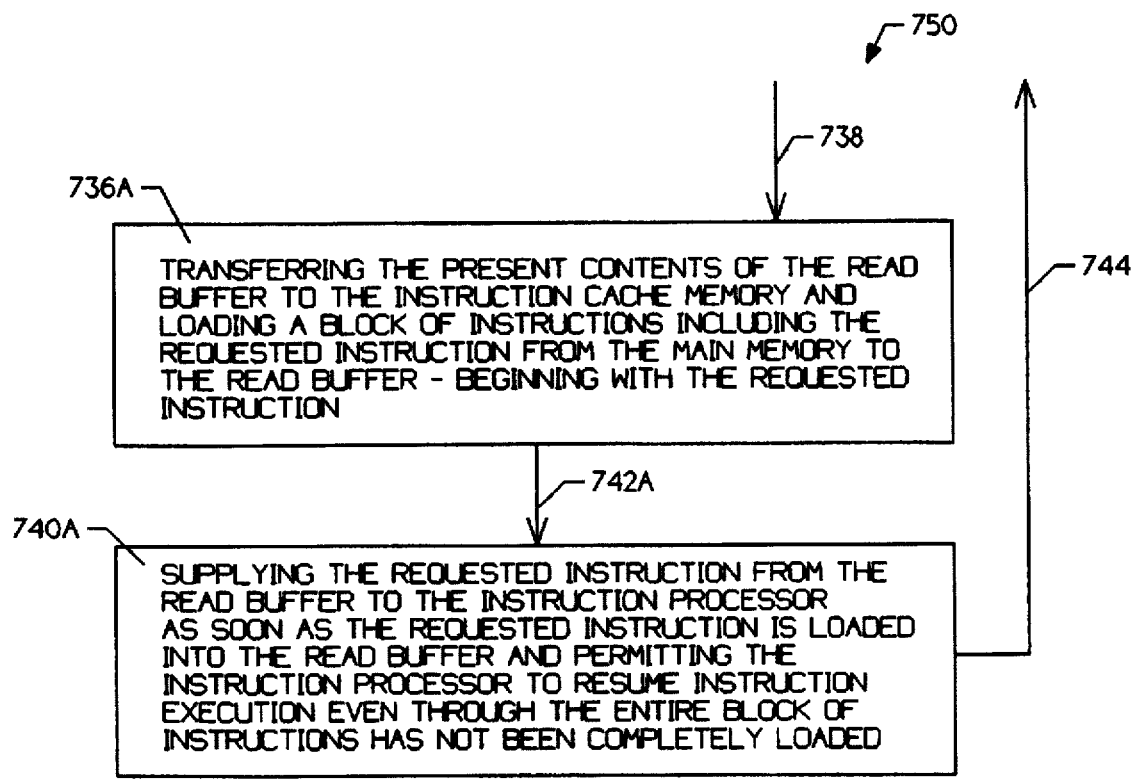
FIG. 13 is a flow diagram showing alternative steps to the loading and supplying steps of FIG. 12.

FIG. 13 is a flow diagram showing alternative steps to the loading step 736 and supplying step 740 of FIG. 12. The diagram is generally shown at 750. It is contemplated that the loading step 736 and the supplying step 740 of FIG. 12 may be replaced by the transferring step 736A and the supplying step 740A of FIG. 13. The transferring step 736A transfers the present contents of the read buffer to the instruction cache memory and loads a block of instructions, including the requested instruction, from the main memory to the read buffer. It is contemplated that the block of instructions may be loaded into the read buffer, beginning with the requested instruction. Control is then passed to the supplying step 740A via interface 742A. The supplying step 740A supplies the requested instruction from the read buffer to the instruction processor as soon as the requested instruction is loaded into the read buffer. Further, the supplying step 740A permits the instruction processor to resume instruction execution even though the entire block of instructions has not been completed loaded into the read buffer.

Having thus described the preferred embodiments in sufficient detail for those of skill in the art to make and use the present invention, those of skill in the art will be readily able to apply the teachings found herein to yet other embodiments within the scope of the claims hereto attached.

What is claimed is:

1. In a data processing system having an instruction processor, a main memory, and an instruction cache memory having an output, wherein the instruction cache memory provides a plurality of requested instructions to the instruction processor until the instruction processor requests a selected instruction that is not resident within the instruction cache memory, wherein the instruction cache memory detects a cache miss and provides a cache miss signal; the instruction cache memory then reads a requested block of instructions that includes the selected instruction from the main memory, the improvement comprising:

a. a selector coupled to the instruction cache memory and the instruction processor, said selector selecting the output of the instruction cache memory such that the plurality of requested instructions are provided to the instruction processor up until a cache miss is detected, said selector selecting a predetermined null instruction and providing the predetermined null instruction to the instruction processor after the cache miss is detected.

2. A data processing system according to claim 1 wherein the instruction cache memory reads the requested block of instructions beginning with the selected instruction first.

3. A data processing system according to claim 2 wherein said selector selects the predetermined null instruction up until the selected instruction is read into the instruction cache memory, wherein said selector then selects the output of the instruction cache memory and provides the selected instruction to the instruction processor.

4. A data processing system according to claim 3 wherein said instruction processor comprises an instruction address pipeline for performing address incrementation, and an instruction pipeline.

5. A data processing system according to claim 4 wherein the instruction cache memory provides the cache miss signal directly to the instruction address pipeline.

6. An improvement according to claim 5 wherein the instruction cache memory is physically located close to the instruction address pipeline within the data processing system such that the cache miss signal is received by the instruction address pipeline in sufficient time to halt address incrementation in response thereto.

7. A data processing system according to claim 6 wherein the instruction cache memory and the instruction address pipeline are physically located on the same substrate.

8. In a data processing system having an instruction processor, a main memory, an instruction cache memory having an output, and a read buffer having an output; the instruction cache memory provides a plurality of requested instructions to the instruction processor until the instruction processor requests a selected instruction that is not resident within the instruction cache memory, wherein the instruction cache memory detects a cache miss and provides a cache miss signal; the read buffer then reading a requested block of instructions that includes the selected instruction from the main memory, the improvement comprising:

a. a selector coupled to the instruction cache memory, the read buffer and the instruction processor, said selector selecting the output of the instruction cache memory such that the plurality of requested instructions are provided to the instruction processor up until a cache miss is detected, said selector selecting a predetermined null instruction and providing the predetermined null instruction to the instruction processor after the cache miss is detected, said selector then selecting the output of the read buffer after the selected instruction is read into the read buffer, thereby providing the selected instruction to the instruction processor.

9. A data processing system according to claim 8 wherein said the instruction cache memory reads the requested block of instructions beginning with the selected instruction first.

10. A data processing system according to claim 8 further comprises an instruction cache loading means coupled to said instruction cache memory and to the read buffer for loading the requested block of instructions from the read buffer to the instruction cache memory when a subsequent cache miss is detected.

11. A data processing system according to claim 10 wherein the read buffer further comprises a no save designator for conditionally preventing said instruction cache loading means from loading the requested block of instructions from the read buffer into the instruction cache memory.

12. A data processing system according to claim 8 wherein said instruction processor comprises an instruction address pipeline for performing address incrementation, and an instruction pipeline.

13. A data processing system according to claim 12 wherein the instruction cache memory provides the cache miss signal directly to the instruction address pipeline.

14. An improvement according to claim 13 wherein the instruction cache memory is physically located close to the instruction address pipeline within the data processing system such that the cache miss signal is received by the instruction address pipeline in sufficient time to halt address incrementation in response thereto.

15. A data processing system according to claim 14 wherein the instruction cache memory and the instruction address pipeline are physically located on the same substrate.

16. A data processing system comprising:

a. a main memory;
   b. an instruction processor;
   c. an instruction cache memory having an output, said instruction cache memory coupled to said instruction processor for holding a plurality of blocks of instructions;
   d. a read buffer having an output, said read buffer coupled to said main memory and to said instruction cache memory for storing at least one of said plurality of blocks of instructions;
   e. instruction control means coupled to said main memory and said read buffer for transferring said at least one of said plurality of blocks of instructions from said main memory to said read buffer when a first cache miss is detected, said one of said plurality of blocks of instructions including a requested instruction; and
   f. selection means coupled to the output of said instruction cache memory, the output of said read buffer, and said instruction processor; said selection means selecting the output of said instruction cache memory thereby providing the plurality of instructions to said instruction processor until said first cache miss is detected, wherein said selection means selects a predetermined null instruction after said first cache miss is detected.

17. A data processing system according to claim 16 wherein said selection means continues to select said null instruction until said requested instruction is loaded into said read buffer by said instruction control means; said selecting means selecting said output of said read buffer when said requested instruction is loaded into said read buffer thereby providing said requested instruction to said instruction processor.

18. A data processing system according to claim 17 wherein said instruction control means includes instruction cache loading means for transferring said at least one of said plurality of blocks of instructions beginning with said requested instruction.

19. A data processing system according to claim 17 further comprising instruction cache loading means for loading said at least one of said plurality of blocks of instructions from said read buffer into said instruction cache memory.

20. A data processing system according to claim 19 wherein said instruction cache loading means loads said at least one of said plurality of blocks of instructions from said read buffer into said instruction cache memory when a second instruction cache miss is detected.

21. A data processing system according to claim 20 wherein said read buffer further comprises a no save designator for conditionally preventing said instruction cache loading means from loading a particular one of said at least one plurality of blocks of instructions into said instruction cache memory from said read buffer.

22. A data processing system according to claim 16 wherein the instruction cache memory provides the first cache miss signal.

23. A data processing system according to claim 22 wherein said instruction processor comprises an instruction address pipeline for performing address incrementation, and an instruction pipeline.

24. A data processing system according to claim 23 wherein said instruction cache memory provides the first cache miss signal directly to the instruction address pipeline.

25. A data processing system according to claim 24 wherein the instruction cache memory is physically located close to the instruction address pipeline within the data processing system such that the cache miss signal is received by the instruction address pipeline in sufficient time to halt address incrementation in response thereto.

26. A data processing system according to claim 25 wherein said instruction cache memory, said read buffer, and said instruction control means are all located on a single substrate.

27. A method for supplying an instruction to an instruction processor in a data processing system having a main memory and an instruction cache memory having an output, the instruction cache memory providing a plurality of instructions to the instruction processor until the instruction processor requests a selected instruction that is not resident within the instruction cache memory, wherein the instruction cache memory detects a cache miss and provides a cache miss signal; the instruction cache memory then reading a requested block of instructions that includes the selected instruction from the main memory, the method comprising the steps of:

a. selecting the output of the instruction cache memory such that the plurality of instructions are provided to the instruction processor, until the cache miss is detected; and b. selecting a predetermined null instruction and providing the predetermined null instruction to the instruction processor after the cache miss is detected.

28. A method according to claim 27 wherein said selecting step (b) selects the predetermined null instruction until the selected instruction is read into the instruction cache memory, wherein said selecting step (b) then selects the output of the instruction cache memory and provides the selected instruction to the instruction processor.

29. A method according to claim 28 wherein said instruction processor comprises an instruction address pipeline and an instruction pipeline, the method further comprising: provides the cache miss signal directly from the instruction cache memory to the instruction address pipeline.

30. A method for supplying an instruction to an instruction processor in a data processing system having a main memory, an instruction cache memory having an output, and a read buffer having an output; the instruction cache memory providing a plurality of instructions to the instruction processor until the instruction processor requests a selected instruction that is not resident within the instruction cache memory, wherein the instruction cache memory detects a cache miss and provides a cache miss signal; the read buffer then reading a requested block of instructions that includes the selected instruction from the main memory, the method comprising the steps of:

a. selecting the output of the instruction cache memory such that the plurality of instructions are provided to the instruction processor until a cache miss is detected;

b. selecting a predetermined null instruction and providing the predetermined null instruction to the instruction processor after the cache miss is detected; and c. selecting the output of the read buffer after the selected instruction is read into the read buffer, thereby providing the selected instruction to the instruction processor.

31. A method according to claim 30 further comprises a loading step for loading the requested block of instructions from the read buffer to the instruction cache memory when a subsequent cache miss is detected.

32. A method according to claim 31 further comprising a preventing step for conditionally preventing said loading step from loading the requested block of instructions into the instruction cache memory from the read buffer.

33. A method according to claim 32 wherein said instruction processor comprises an instruction address pipeline and an instruction pipeline.

34. A method according to claim 33 wherein the cache miss signal is provided directly from the instruction cache memory to the instruction address pipeline.

35. A method of supplying an instruction from a main memory to an instruction processor via an instruction cache memory and a read buffer, comprising the steps of:

a. determining if the instruction processor is requesting an instruction;

b. searching the present contents of the instruction cache memory to determine whether said requested instruction is present in the instruction cache memory, and supplying said requested instruction to the instruction processor if the requested instruction is present in the instruction cache memory;

c. indicating a cache miss if the requested instruction is not present in the instruction cache memory;

d. searching the present contents of the read buffer to determine whether the requested instruction is present in the read buffer, and supplying the requested instruction to the instruction processor if the requested instruction is present in the read buffer;

e. supplying a predetermined null instruction to the instruction processor if the requested instruction is not present in either the instruction cache memory or the read buffer;

f. requesting a block of instructions containing the requested instruction from the main memory if the requested instruction is not present in either the instruction cache memory or the read buffer;

g. loading the block of instructions into the read buffer thereby overwriting the present contents of the read buffer; and h. supplying the requested instruction to the instruction processor from the read buffer after said loading step loads the requested instruction into the read buffer.

36. A method according to claim 35 further comprising the step of:

a. transferring the present contents of the read buffer to the instruction cache memory during said loading step (g) if said indicating step (c) indicates a cache miss.

37. A method according to claim 35 wherein said loading step 35(g) begins with a data element containing the requested instruction.

38. A method according to claim 37 further comprising:

a. supplying the requested instruction to the instruction processor from the read buffer as soon as the requested instruction is loaded into the read buffer via said loading step 35(g); and b. permitting the instruction processor to resume instruction execution after completion of said supplying step 38(a) even if said loading step 35(g) is not complete.

39. A method according to claim 36 further comprising:

a. indicating a no save designation for predetermined instructions within the read buffer; and b. preventing said transferring step 36(a) as to the predetermined instructions designated no save.

\* \* \* \* \*